US012015619B2

(12) United States Patent
Subbanna et al.

(10) Patent No.: US 12,015,619 B2
(45) Date of Patent: *Jun. 18, 2024

(54) DYNAMIC ROUTING OF ACCESS REQUEST STREAMS IN A UNIFIED POLICY ENFORCEMENT SYSTEM

(71) Applicant: NetSkope, Inc., Santa Clara, CA (US)

(72) Inventors: Kartik Subbanna, Bangalore (IN); Amit Ganesh Datar, Fremont, CA (US); Kand Ly, San Francisco, CA (US)

(73) Assignee: Netskope, Inc., Santa Clara, CA (US)

( * ) Notice: Subject to any disclaimer, the term of this patent is extended or adjusted under 35 U.S.C. 154(b) by 6 days.

This patent is subject to a terminal disclaimer.

(21) Appl. No.: 17/163,415

(22) Filed: Jan. 30, 2021

(65) Prior Publication Data

US 2022/0247761 A1    Aug. 4, 2022

(51) Int. Cl.
*H04L 9/40*    (2022.01)
*H04L 67/02*    (2022.01)

(52) U.S. Cl.
CPC ...... *H04L 63/1416* (2013.01); *H04L 63/0236* (2013.01); *H04L 63/1425* (2013.01); *H04L 63/20* (2013.01)

(58) Field of Classification Search
CPC . H04L 63/20; H04L 63/0245; H04L 63/0236; H04L 63/1425; H04L 63/0254;
(Continued)

(56) References Cited

U.S. PATENT DOCUMENTS 6,574,655 B1    6/2003 Libert et al.
6,671,691 B1    12/2003 Bigus
(Continued)

FOREIGN PATENT DOCUMENTS

JP    2012084141 A    4/2012
JP    2015130112 A    7/2015
(Continued)

OTHER PUBLICATIONS

Makhdoom et al., "Anatomy of Threats to the Internet of Things," IEEE Communications Surveys & Tutorials Year: 2019 | vol. 21, Issue: 2 | Journal Article | Publisher: IEEE.*

(Continued)

*Primary Examiner* — Roderick Tolentino
(74) *Attorney, Agent, or Firm* — HAYNES BEFFEL & WOLFELD LLP; Ernest J. Beffel, Jr.

(57) ABSTRACT

The technology discloses processing incoming access requests of packets through cloud-based components that perform (a) packet-level access control and traffic inspection, (b) protocol-level access control and traffic inspection, (c) threat detection, and (d) activity contextualization, including a packet and stream router conveying each incoming access request of packets through all of components (a)-(d) that apply, at least until one of the components sets a restrictive state on at least one object corresponding to the incoming access request or until all of the components that apply have passed the incoming access request. The disclosed method also includes a restrictive state analyzer determining whether the first, second, third or fourth restrictive state has been set due to malformed packets, malicious signatures, requests directed to a threat destination or an activity classified as compromising, and based on setting of any of the states, taking restrictive steps in response to the incoming access request.

20 Claims, 14 Drawing Sheets

(58) Field of Classification Search
CPC ............. H04L 47/2441; H04L 63/1416; H04L 43/028; H04W 88/12
See application file for complete search history.

(56) References Cited

U.S. PATENT DOCUMENTS

| | | | |
|---|---|---|---|
| 7,302,700 | B2 | 11/2007 | Mao et al. |
| 7,996,373 | B1 | 8/2011 | Zoppas et al. |
| 8,127,365 | B1 | 2/2012 | Liu et al. |
| 8,130,747 | B2 | 3/2012 | Li et al. |
| 8,438,630 | B1 | 5/2013 | Clifford |
| 8,613,070 | B1 | 12/2013 | Borzycki et al. |
| 8,776,249 | B1 | 7/2014 | Margolin |
| 8,819,772 | B2 | 8/2014 | Bettini et al. |
| 8,856,869 | B1* | 10/2014 | Brinskelle ........... H04L 63/0823 726/2 |
| 9,069,992 | B1 | 6/2015 | Vaikar et al. |
| 9,171,008 | B2 | 10/2015 | Prahlad et al. |
| 9,430,646 | B1* | 8/2016 | Mushtaq ................. H04L 67/02 |
| 9,613,190 | B2 | 4/2017 | Ford et al. |
| 10,162,767 | B2 | 12/2018 | Spurlock et al. |
| 10,235,520 | B2 | 3/2019 | Bae |
| 10,291,657 | B2 | 5/2019 | Narayanaswamy et al. |
| 10,349,304 | B2 | 7/2019 | Kim et al. |
| 10,594,730 | B1 | 3/2020 | Summers et al. |
| 10,848,461 | B2 | 11/2020 | Hira et al. |
| 11,019,101 | B2 | 5/2021 | Narayanaswamy et al. |
| 2005/0289354 | A1 | 12/2005 | Borthakur et al. |
| 2008/0040790 | A1 | 2/2008 | Kuo |
| 2008/0127303 | A1 | 5/2008 | Wrighton et al. |
| 2008/0216174 | A1 | 9/2008 | Vogel et al. |
| 2010/0146269 | A1 | 6/2010 | Baskaran |
| 2011/0047590 | A1 | 2/2011 | Carr et al. |
| 2011/0131408 | A1 | 6/2011 | Cook et al. |
| 2011/0302657 | A1 | 12/2011 | Ikegami et al. |
| 2012/0047573 | A1 | 2/2012 | Duncan et al. |
| 2014/0007182 | A1 | 1/2014 | Qureshi et al. |
| 2014/0007222 | A1 | 1/2014 | Qureshi et al. |
| 2014/0026181 | A1 | 1/2014 | Kiang et al. |
| 2014/0026182 | A1 | 1/2014 | Pearl et al. |
| 2014/0165134 | A1 | 6/2014 | Goldschlag et al. |
| 2014/0282854 | A1 | 9/2014 | Clark et al. |
| 2014/0310392 | A1 | 10/2014 | Ho |
| 2015/0172120 | A1 | 6/2015 | Dwarampudi et al. |
| 2015/0254469 | A1 | 9/2015 | Butler |
| 2015/0271207 | A1 | 9/2015 | Jaiswal et al. |
| 2015/0326613 | A1* | 11/2015 | Devarajan ................ H04L 63/20 726/1 |
| 2016/0088020 | A1 | 3/2016 | Chan et al. |
| 2016/0269467 | A1 | 9/2016 | Lee et al. |
| 2016/0275577 | A1 | 9/2016 | Kolluri Venkata Sesha et al. |
| 2016/0277374 | A1 | 9/2016 | Reid et al. |
| 2016/0285918 | A1 | 9/2016 | Peretz et al. |
| 2016/0292445 | A1 | 10/2016 | Lindemann |
| 2017/0063720 | A1 | 3/2017 | Foskett et al. |
| 2017/0091453 | A1 | 3/2017 | Cochin |
| 2017/0091482 | A1 | 3/2017 | Sarin et al. |
| 2017/0093867 | A1 | 3/2017 | Burns et al. |
| 2017/0206353 | A1 | 7/2017 | Jai et al. |
| 2017/0264628 | A1 | 9/2017 | Treat et al. |
| 2017/0264640 | A1 | 9/2017 | Narayanaswamy et al. |
| 2017/0372339 | A1 | 12/2017 | Davis |
| 2018/0027006 | A1 | 1/2018 | Zimmermann et al. |
| 2018/0063182 | A1 | 3/2018 | Jones et al. |
| 2018/0115470 | A1 | 4/2018 | Huang et al. |
| 2018/0295137 | A1* | 10/2018 | Zager ................. H04L 63/0861 |
| 2018/0324204 | A1 | 11/2018 | McClory et al. |
| 2019/0007394 | A1 | 1/2019 | Patel et al. |
| 2019/0034295 | A1 | 1/2019 | Bourgeois et al. |
| 2019/0081958 | A1* | 3/2019 | Lee ..................... H04L 63/0209 |
| 2020/0053129 | A1 | 2/2020 | Neystadt et al. |
| 2020/0177606 | A1 | 6/2020 | Valluri et al. |
| 2020/0259792 | A1 | 8/2020 | Devarajan et al. |
| 2020/0274851 | A1 | 8/2020 | Qiao et al. |
| 2020/0372040 | A1 | 11/2020 | Boehmann et al. |
| 2021/0112078 | A1* | 4/2021 | Huston, III ......... H04L 63/1433 |
| 2021/0182416 | A1 | 6/2021 | Pang et al. |
| 2021/0258348 | A1* | 8/2021 | Vivekanandan ........ H04L 63/20 |
| 2021/0392146 | A1* | 12/2021 | Lin ....................... G06F 21/552 |
| 2022/0078209 | A1* | 3/2022 | V ............................. H04L 63/20 |
| 2022/0103597 | A1* | 3/2022 | Gobena ................. H04L 63/205 |

FOREIGN PATENT DOCUMENTS

| | | | |
|---|---|---|---|
| WO | | 2006137057 A2 | 12/2006 |
| WO | | 2007009255 A1 | 1/2007 |
| WO | | 2012058487 A2 | 5/2012 |
| WO | PCT/US2017/021969 | | 3/2017 |
| WO | | 2019226363 A1 | 11/2019 |
| WO | PCT/US2022/014134 | | 1/2022 |

OTHER PUBLICATIONS

Han et al., "CloudDLP: Transparent and Scalable Data Sanitization for Browser-Based Cloud Storage," IEEE Access Year: 2020 | vol. 8 | Journal Article | Publisher: IEEE.*
U.S. Appl. No. 16/409,685—Notice of Allowance dated Dec. 3, 2020, 18 pages.
Cheng et al, "Cloud Security for Dummies, Netskope Special Edition" John Wiley & Sons, Inc. 2015, 53 pages.
"Netskope Introspection," netSkope, Inc., 2015, 3 pgs.
"Data Loss Prevention and Monitoring in the Cloud" by netSkope, Inc., Nov. 2014, 18 pgs.
"Cloud Data Loss Prevention Reference Architecture", Sep. 2015, Netskope, WP-88-1, 2 pages.
"The 5 Steps to Cloud Confidence," netSkope, Inc., 2014, 11 pgs.
"The Netskope Active Platform Enabling Safe Migration to the Cloud", Apr. 2015, DS-1-8, Netskope, Inc., 6 pages.
"The Netskope Advantage: Three "Must-Have" Requirements for Cloud Access Security Brokers", Jul. 2015, WP-12-2, 4 pages.
"Netskope the 15 Critical CASB Use Cases", Netskope, Inc., EB-141-1, 19 pages.
"Netskope Active Cloud DLP," netSkope, Inc., 2015, 4 pgs.
"Repave the Cloud-Data Breach Collision Course," netSkope, Inc., 2014, 6 pgs.
"Netskope Cloud Confidence Index™," netSkope, Inc., 2015, 2 pgs.
NetSkope, Inc., "Shift your Web Security to the Cloud, for the Cloud", Netskope Threat Research Labs, 2019, 10 pages.
Netskope, Inc. "Next Generation Secure Web Gateway", 2020, 4 pages.
Lawson et al, "Magic Quadrant for Cloud Access Security Brokers", Gartner Reprint, Oct. 28, 2020, 21 pages (https://www.gartner.com/doc/reprints?id=1-24H7PDVD&ct=201028&st=sb).
Netskope, Inc. "What is a Cloud Access Security Broker (CASB)?", Nov. 2, 2020, 6 pages (https://www.netskope.com/about-casb).
U.S. Appl. No. 15/368,246—Office Action dated Apr. 5, 2019, 40 pages.
U.S. Appl. No. 15/368,246—Response to Office Action dated Apr. 5, 2019, filed May 3, 2019, 16 pages.
PCT/US2017/021969—International Search Report and Written Opinion dated Jun. 22, 2017, 11 pages.
U.S. Appl. No. 15/368,246—Supplemental Response to Office Action dated Apr. 5, 2019, filed Oct. 25, 2019, 8 pages.
Yague et al., "A Metadata-based access control model for web services", Computer Science Department, Internet Research, vol. 15, No. 1, University of Malaga, Malaga, Spain, Dec. 31, 2005, pp. 99-116, XP002770914.
U.S. Appl. No. 15/368,240—Response to Final Office Action dated Feb. 8, 2019 filed Apr. 19, 2019, 32 pages.
Kuwabara etal., "Use of Metadata for Access Control and Version Management in RDF Database", Sep. 12, 2011, Knowledge-Based and Intelligent Information and Engineering Systems, Springer Berling Heidelberg, pp. 326-336, XP019164752.
Kark et al, "Trends: Calculating the Cost of a Security Breach", Forrester Research, Inc. Apr. 10, 2007, 7 pgs.
U.S. Appl. No. 15/368,240—Office Action dated Aug. 7, 2018, 28 pages.

(56) References Cited

OTHER PUBLICATIONS

"Data Breach: The Cloud Multiplier Effect", Ponemon Institute, Jun. 4, 2014, 27 pages.
U.S. Appl. No. 15/368,240—Response to Office Action dated Aug. 7, 2018, filed Oct. 11, 2018, 25 pages.
Riley et al, "Magic Quadrant for Cloud Access Security Brokers", Nov. 30, 2017, 28 pages, downloaded from <<https://go.netskope.com/typ-gartner-mq-for-casb.html>>.
U.S. Appl. No. 16/000,132—Notice of Allowance dated Dec. 28, 2018, 16 pages.
Lakshman et al, "Cassandra—A Decentralized Structured Storage System", 2009, 6 pages.
JP-20185473875—Notice of Allowance with Allowed Claims dated Mar. 25, 2019, 7 pages.
DeCandia et al, "Dynamo: Amazon's Highly Available Key-value Store", SOSP '07, Oct. 14-17, 2007, 16 pages.
Chang et al, "Bigtable: A Distributed Storage System for Structured Data", Operating Systems Design and Implementation, OSDI, 2006, 14 pages.
U.S. Appl. No. 15/368,240—Office Action dated Dec. 26, 2019, 40 pages.
U.S. Appl. No. 15/368,246—Office Action dated Jan. 27, 2020, 20 pages.
Laminin Solutions: "Metadata Permissions Protects Confidential Information", Feb. 19, 2013, pp. 1-2 XP002770913.
U.S. Appl. No. 16/783,146—Office Action dated Mar. 27, 2020, 26 pages.
PCT/US2017/021969—International Preliminary Report on Patentability dated Mar. 5, 2018, 13 pages.
U.S. Appl. No. 16/783,146—Response to Office Action dated Mar. 27, 2020, filed Jun. 4, 2020, 21 pages.
U.S. Appl. No. 16/000,132—Response to Office Action dated Oct. 2, 2018, filed Nov. 13, 2018, 16 pages.
U.S. Appl. No. 16/783,146—Notice of Allowance dated Jun. 17, 2020, 13 pages.
EP-17713822.9, Rule 71(3) Allowance Communication dated Mar. 8, 2019, 147 pages.
U.S. Appl. No. 15/368,240—Notice of Allowance dated Jun. 29, 2020, 22 pages.
Cheng et al., "Cloud Security for Dummies, Netskope Special Edition," John Wiley & Sons, Inc. 2015.
Sumit Khurana, et. al., "Performance evaluation of Virtual Machine (VM) scheduling policies in Cloud computing (spaceshared & timeshared)"; 2013 Fourth International Conference on Computing, Communications and Networking Technologies (ICCCNT); Year: Jul. 2013; pp. 1-5.
U.S. Appl. No. 16/000,132—Office Action dated Oct. 2, 2018, 18 pages.
U.S. Appl. No. 16/409,685—Office Action dated Jul. 14, 2020, 28 pages.
EP-19189235.5 Extended European Search Report dated Nov. 27, 2019, 5 pages.
U.S. Appl. No. 15/368,246—Notice of Allowance dated Oct. 6, 2020, 22 pages.
U.S. Appl. No. 15/368,240—Office Action dated Feb. 8, 2019, 28 pages.
Gowadia et al., "RDF Metadata for XML Access Control", Proceedings of the ACM Workshop on XML Security 2003. Fairfax, VA, Oct. 31, 2003, pp. 39-48, XP001198168.
U.S. Appl. No. 17/163,416—Office Action dated Mar. 23, 2021, 32 pages.
U.S. Appl. No. 16/409,685—Notice of Allowance dated Apr. 12, 2021, 38 pages.
U.S. Appl. No. 15/368,246—Response to Office Action dated Jan. 27, 2020, filed May 25, 2020, 16 pages.
U.S. Appl. No. 16/409,685—Response to Office Action dated Jul. 14, 2020, filed Oct. 14, 2020, 9 pages.
U.S. Appl. No. 17/163,408, filed Jan. 30, 2021, Allowed.
U.S. Appl. No. 17/163,416—Response to Office Action dated Mar. 23, 2021, filed Apr. 26, 2021, 13 pages.
U.S. Appl. No. 17/163,416—Final Office Action dated May 12, 2021, 34 pages.
U.S. Appl. No. 17/163,411—Office Action dated Jun. 28, 2021, 71 pages.
U.S. Appl. No. 16/409,685—Notice of Allowance dated Sep. 3, 2021, 20 pages.
U.S. Appl. No. 17/163,408, filed Jan. 30, 2021, U.S. Pat. No. 11,159,576, Oct. 29, 2021, Granted.
U.S. Appl. No. 17/384,618, filed Jul. 23, 2021, Pending.
U.S. Appl. No. 16/409,685, filed May 10, 2019, US 2019-0268381 A1, Aug. 29, 2019, Allowed.
U.S. Appl. No. 17/163,415—Response to Final Office Action dated May 12, 2021, filed Sep. 9, 2021, 12 pages.
U.S. Appl. No. 17/163,416—Response to Final Office Action dated May 12, 2021, filed Sep. 10, 2021, 12 pages.
U.S. Appl. No. 17/163,411—Final Office Action dated Oct. 25, 2021, 50 pages.
U.S. Appl. No. 17/163,416—Nonfinal Office Action dated Dec. 10, 2021, 29 pages.
Netskope, "The 5 Steps to Cloud Confidence," netSkope, Inc., 2014, 11 pgs.
"Netskope Cloud Confidence Index," netSkope, Inc., 2015, 4 pgs.
JP 2019-081108 Notice of Allowance, dated Oct. 26, 2021, 5 pages.
EP 19189235.5 Certificate of Grant, dated Aug. 18, 2021, 1 pages.
EP 17713822.9 Decision to Grant, dated Aug. 1, 2019, 2 pages.
JP 2019-081108 Response to First Office Action dated May 18, 2021, filed Sep. 21, 2021, 13 pages.
U.S. Appl. No. 17/163,408, filed Jan. 30, 2021, U.S. Pat. No. 11,159,576, Granted.
U.S. Appl. No. 17/163,411, filed Jan. 30, 2021, Pending.
U.S. Appl. No. 17/163,416, filed Jan. 30, 2021, Pending.
PCT/US2022/014134—International Search Report and Written Opinion, dated May 4, 2022, 9 pages.
Khanuja et. al., "Role of Metadata in Forensic Analysis of Database Attacks", IEEE, 2014, 6 pages.
EP 211917349 Extended European Search Report, dated Jul. 12, 2022, 9 pages.
Bremler-Barr et. al., "Deep Packet Inspection as a Service", 12 pages.
U.S. Appl. No. 17/163,408, filed Jan. 30, 2021, U.S. Pat. No. 11,159,546, Oct. 26, 2021, Granted.
U.S. Appl. No. 17/384,618, filed Jul. 23, 2021, US-2022-0247788-A1, Aug. 4, 2022, Pending.
U.S. Appl. No. 17/163,411, filed Jan. 30, 2021, US-2022-0247768-A1, Aug. 4, 2022, Pending.
U.S. Appl. No. 17/163,416, filed Jan. 30, 2021, US-2022-0247785-A1, Aug. 4, 2022, Pending.
U.S. Appl. No. 15/368,240, filed Dec. 2, 2016, U.S. Pat. No. 10,826,940, Nov. 3, 2020, Granted.
U.S. Appl. No. 15/368,246, filed Dec. 2, 2016, US-2017-0264619-A1, Sep. 14, 2017, Allowed.
U.S. Appl. No. 16/000,132, filed Jun. 5, 2018, U.S. Pat. No. 10,291,657, May 14, 2019, Granted.
U.S. Appl. No. 16/409,685, filed May 10, 2019, U.S. Pat. No. 10,979,458, Apr. 13, 2021, Granted.
U.S. Appl. No. 16/783,146, filed Feb. 5., 2020, U.S. Pat. No. 10,812,531, Oct. 20, 2020, Granted.
U.S. Appl. No. 17/227,074, filed Apr. 9, 2021, US-2021-0226998-A1, Jul. 22, 2021, Pending.
Muller, HTTPS Inspection with Cisco Umbrella, Checkpoint Software Technolgoes Ltd., Dec. 3, 2018, 2 pages, (downloaded from Dec. 15, 2023 from https://community.checkpoint.com/t5/General-Topics/White-Paper-HTTPS-Inspection-with-Cisco-Umbrella-How-To/td-p/53421#).
Cisco Umbrella Package Comparison Datasheet, Cisco Inc., Jan. 8, 2021, 2 pages.
What is Cisco Umbrella?, RST Forum.net, Nov. 19, 2021, 35 pages (downloaded Jan. 19, 2023 from https://rstforum.net/whitepaper/cisco-umbrella/) What is Cisco Umbrella?

\* cited by examiner

Policies >
Real-Time Protection Policy  624

SAVED FILTERS ▽

[ 🔍 -Policy Name-  × ]  [ + ADD FILTER ]  [▣]                                  ⚠ View pending changes [APPLY CHANGES]

NEW POLICY ▽                                                                                                    [▦][≡]

| | Access Control △ | Cloud App | Any | DESTINATION | PROFILE | ACTION | |
|---|---|---|---|---|---|---|---|
| | DLP | Category | | | | | |
| | Threat Protection | Firewall  644 | | | | | |
| | IPS | Private App | | | | | |
| ⋮⋮ | 1 Malware policy for all | Any | | ≡ Cloud Storage<br>↓ Download, Upload | ⊙ Default Malware Scan  High: ⊘ Block | ••• |
| ⋮⋮ | 2 Forcepoint Cloud | Any | | ▦ [Forcepoint] | None | ⊘ Allow | ••• |
| ⋮⋮ | 3 Lync Test | Any | | ▦ Box | None | ⊘ Allow | ••• |
| ⋮⋮ | ⚠ 4 Aspera Connect | ▢ Aspera IP | | ▦ Any Traffic | None | ⊘ Allow | ••• |
| ⋮⋮ | 5 Test_Deepak | ⚇ bdeepak@netskope.com | | ▦ Box, Microsoft Office 365<br>OneDrive for Business<br>↓ Download, Upload | ⊙ Default Malware Scan  High: △ Alert | ••• |
| ⋮⋮ | 6 Firewall_1 | ▢ Firewall_1 IP | | ▦ [TCP_54000] | None | ⊘ Allow | ••• |

FIG. 6

DYNAMIC ROUTING OF ACCESS REQUEST STREAMS IN A UNIFIED POLICY ENFORCEMENT SYSTEM

RELATED CASES

This application is related to the following contemporaneously filed applications which are incorporated by reference for all purposes as if fully set forth herein:

U.S. Non-Provisional patent application Ser. No. 17/163,408 titled "Unified Policy Enforcement Management in the Cloud", filed on 30 Jan. 2021; and U.S. Non-Provisional patent application Ser. No. 17/163,411 titled "Dynamic Distribution of Unified Policies in a Cloud-Based Policy Enforcement System", filed on 30 Jan. 2021; and U.S. Non-Provisional patent application Ser. No. 17/163,416 titled "Unified System for Detecting Policy Enforcement Issues in a Cloud-Based Environment", filed on 30 Jan. 2021.

INCORPORATIONS

The following materials are incorporated by reference for all purposes as if fully set forth herein:

U.S. Non-Provisional patent application Ser. No. 16/807,128, titled "Load Balancing in a Dynamic Scalable Services Mesh" filed on Mar. 2, 2020, which claims the benefit of U.S. Patent Application No. 62/812,760, titled "Load Balancing in a Dynamic Scalable Services Mesh," filed on Mar. 1, 2019, U.S. Non-Provisional patent application Ser. No. 16/807,132. titled "Recovery From Failure in a Dynamic Scalable Services Mesh", filed Mar. 2, 2020, now U.S. Pat. No. 10,868,845, issued Dec. 15, 2020, which claims the benefit of U.S. Provisional Patent Application No. 62/812,791 titled "Recovery from Failure in a Dynamic Scalable Services Mesh," files on Mar. 1, 2019, U.S. Non-Provisional application Ser. No. 14/198,508, titled "Security for Network Delivered Services", filed on Mar. 5, 2014, now U.S. Pat. No. 9,270,765, issued Feb. 23, 2016, U.S. Non-Provisional application Ser. No. 14/198,499, titled "Security for Network Delivered Services", filed Mar. 5, 2014, now U.S. Pat. No. 9,398,102, issued on Jul. 19, 2016, U.S. Non-Provisional application Ser. No. 14/835,640, titled "Systems and Methods of Monitoring and Controlling Enterprise Information Stored on a Cloud Computing Service (CCS)", filed on Aug. 25, 2015. now U.S. Pat. No. 9,928,377, issued on Mar. 27, 2018, U.S. Non-Provisional application Ser. No. 15/368,246, titled "Middle Ware Security Layer for Cloud Computing Services", filed on Dec. 2, 2016, which claims the benefit of U.S. Provisional Application No. 62/307,305, titled "Systems and Methods of Enforcing Multi-Part Policies om Data-Deficient Transactions of Cloud Computing Services", filed on Mar. 11, 2016, "Cloud Security for Dummies, Netskope Special Edition" by Cheng, Ithal, Narayanaswamy, and Malmskog, John Wiley & Sons, Inc. 2015, "Netskope Introspection" by Netskope, Inc., "Data Loss Prevention and Monitoring in the Cloud" by Netskope, Inc., "Cloud Data Loss Prevention Reference Architecture" by Netskope, Inc., "The 5 Steps to Cloud Confidence" by Netskope, Inc., "The Netskope Active Platform" by Netskope, Inc.

"The Netskope Advantage: Three "Must-Have" Requirements for Cloud Access Security Brokers" by Netskope, Inc., "The 15 Critical CASB Use Cases" by Netskope, Inc.

"Netskope Active Cloud DLP" by Netskope, Inc.,

"Repave the Cloud-Data Breach Collision Course" by Netskope, Inc.; and

"Netskope Cloud Confidence Index™" by Netskope, Inc.

FIELD OF THE TECHNOLOGY DISCLOSED

The technology disclosed relates generally to policy enforcement for network delivered services, and in particular relates to providing a cloud-based policy enforcement system that unifies functions of packet-based and protocol-based access control and traffic inspection, threat detection and activity contextualization on inspectable and non-inspectable traffic.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

The use of cloud services for corporate functionality is common. Research suggests that eighty percent of enterprise workloads will be in the cloud by 2025. According to International Data Corporation, "spending on public cloud information technology (IT) infrastructure surpassed spending on traditional IT infrastructure for the first time in the second quarter of 2020." For example, enterprise companies often utilize software as a service (SaaS) solutions instead of installing servers within the corporate network to deliver services.

Data is the lifeblood of many businesses and must be effectively managed and protected. With the increased adoption of cloud services, companies of all sizes are relying on the cloud to create, edit and store data. This presents new challenges as users access cloud services from multiple devices and share data, including with people outside of an organization. It is easy for data to get out of an organization's control.

Enterprises are faced with the daunting challenge of seamlessly securing critical data traversing the network to access SaaS apps, IaaS, and the web from any endpoint as customers want to be able to securely send all of their data between customer branches and data centers. *All* data includes peer-to-peer file sharing (P2P) via protocols for portal traffic such as BitTorrent (BT), user datagram protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype; Internet traffic, cloud application data, and generic routing encapsulation (GRE) data.

As an example of the size of the P2P file sharing segment of data that needs to be handled securely, BitTorrent, one common protocol for transferring large files such as digital video files containing TV shows or video clips or digital audio files containing songs, had 15-27 million concurrent users at any time and was utilized by 150 million active users as of 2013. Based on these figures, the total number of monthly BitTorrent users was estimated at more than a quarter of a billion, with BitTorrent responsible for 3.35% of worldwide bandwidth, more than half of the 6% of total bandwidth dedicated to file sharing.

As the number of data sources increases, there are hundreds of ways data can be compromised. Employees might send a wrong file, not be careful when rushing to a deadline, or share data and collaborate with people outside of their organization. Native cloud storage sync clients also pose a significant risk to organizations. A continuous sync takes place between the end point and the cloud service without employees realizing they may be leaking confidential company information.

In one use case that exemplifies the need for unified policy enforcement functions, companies may want to allow employees and contractors to make voice calls and participate in video conferences, while not enabling them to transfer files over LTE via SIP and Skype. In another example, an enterprise may want to enable their users to view videos and not be able to upload or download video content files.

Accordingly, it is vital to facilitate the use of cloud services so people can continue to be productive and use the best tools for the job without compromising sensitive information such as intellectual property, non-public financials, strategic plans, customer lists, personally identifiable information belonging to customers or employees, and the like.

An opportunity arises to provide a cloud-based policy enforcement system that unifies functions of packet-based and protocol-based access control and traffic inspection, threat detection and activity contextualization and inspection on inspectable and non-inspectable traffic, expanding beyond cloud apps and web traffic firewalls to securely process P2P traffic over BT, FTP and UDP-based streaming protocols as well as Skype, voice, video and messaging multimedia communication sessions over SIP and web traffic over other protocols.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings.

FIG. 6 shows a representative user interface usable for configuring policy specifications for a cloud-based policy enforcement system that unifies functions of packet-based and protocol-based access control and traffic inspection, threat detection and activity contextualization on inspectable and non-inspectable traffic.

DETAILED DESCRIPTION

Figure 1:
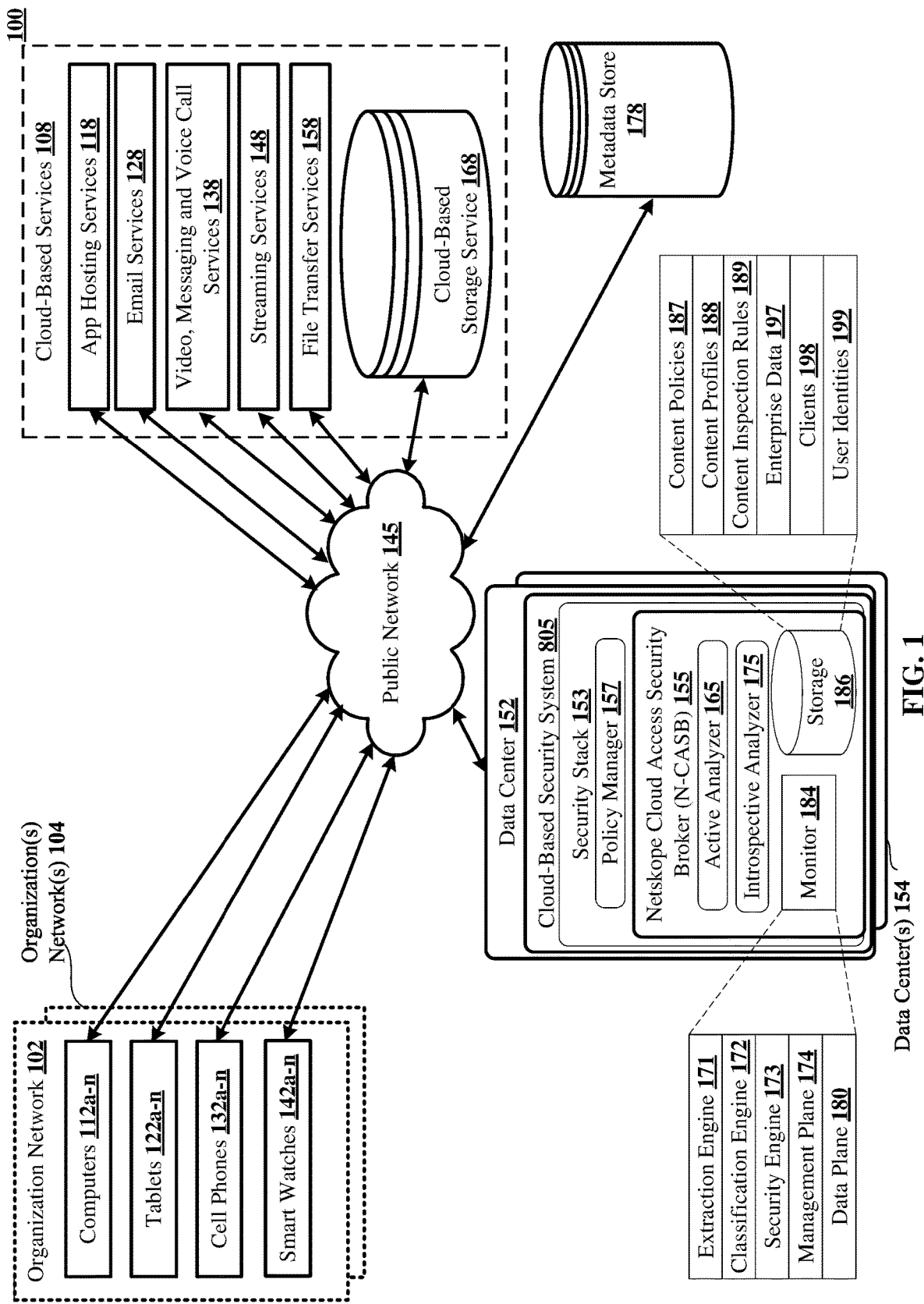
FIG. 1 shows an architectural level schematic of a system for providing a cloud-based policy enforcement system that unifies functions of packet-based and protocol-based access control and traffic inspection, threat detection and activity contextualization on inspectable and non-inspectable traffic, for one embodiment of the disclosed technology.

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Existing approaches for applying policy enforcement services to customer traffic include a security device point of presence (PoP) in the path of data flow between customer branches of organization networks and data centers accessed in the cloud via the Internet.

Each application also has unique requirements around network performance that must be considered. For example, webinar (one-to-many) streaming needs high bandwidth, real-time collaboration needs low latency, and backend systems hosted in virtual private clouds may have very high resilience and redundancy requirements. Further complicating matters, unlike private applications, cloud applications do not have a predictable set of IP addresses and ports, and are constantly changing and evolving, making them a nebulous and ever-changing target.

Customers want to know how to support and secure their complex mix of applications, managed (IT-led), unmanaged (Shadow IT), on-prem, private apps in the cloud, third-party SaaS and more. Organizations want to utilize a single policy enforcement service that can apply policy enforcement services to all customer traffic, expanding beyond cloud apps and web traffic firewalls to securely process P2P traffic over BT, FTP and UDP-based streaming protocols as well as Skype, voice, video and messaging multimedia communication sessions over SIP, and web traffic over other protocols.

Although web security vendors have attempted to address this problem by packaging and moving their legacy solutions to the cloud, this approach does not address policy enforcement challenges created by the use of SaaS and IaaS, or the way the dynamic web is built today. To realize this new network vision, a fundamentally different approach to policy enforcement is needed—one that allows organizations to address these changes head-on with a unified cloud and web policy enforcement platform that was designed from the start for today's next-generation cloud-first enterprise.

In one example, the policy enforcement service needs to allow employees and contractors at an organization to make calls, but not transfer files, a policy that the service can enforce by encoding a SIP control channel and data channel. The enforcement of this policy necessitates more than a SIP proxy to enable the ability to anticipate where the data is getting transferred, and the ability to either avoid or block that channel, based on information in the channel. A streaming agent sending traffic looks at the port only, so needs to know all available ports before sending.

If handling all protocols, the policy enforcement service can catch web traffic over non-standard ports, but it is hard to gather the traffic. An existing workaround for securing files from being transferred is to block access to ports, but policy enforcement services want to load everything, safely—not block ports. P2P data packets try standard ports first, and then often fall back, hopping from port to port, which also limits the usefulness of blocking a port, because the P2P data service can hop to a different port.

Security administrators can install policy enforcement service devices in each of the customer branches of organization networks, in data centers and headquarters, to create a management network for applying enforcement policies, so that all traffic goes through security devices. On premise policy enforcement administrators would then be responsible for managing deployment to ensure high availability of devices with failover management, managing software life cycles with patches, and administering upgrades to respond to hardware life cycles. Issues for this hands-on approach to policy enforcement include scaling when company size changes and load balancing for ensuring adequate service availability as data loads vary.

The disclosed technology offers unified policy management in the cloud, as well as dynamic distribution of unified policies in a cloud-based policy enforcement system. with a policy manager that unifies functions of packet-based and protocol-based access control and traffic inspection, threat detection and activity contextualization on inspectable and non-inspectable traffic. The disclosed policy enforcement services platform scales horizontally and uniformly to administer customized security services and policies for organizations and avoid single points of failure.

The technology also discloses dynamic routing of access request streams and a unified system for detecting policy enforcement issues in a cloud-based environment.

Acronyms

Acronyms used in this disclosure are identified the first time that they are used. These acronyms are terms of art, often used in standards documents. Except where the terms are used in a clear and distinctly different sense than they are used in the art, we adopt the meanings found in security system environments. For the reader's convenience, many of them are listed here:

| | |
|---|---|
| AV | Anti-Virus |
| AWS | Amazon Web Services Cloud Platform |
| BT | BitTorrent communication protocol for P2P file sharing |
| CASB | Cloud Access Security Broker |
| CIDL | Connected Intelligence Data Lake |
| CIDR | Classless Inter-Domain Routing |
| CSPM | Certified Security Project Management |
| CWPP | Cloud Workload Protection Program |
| DHCP | Dynamic Host Configuration Protocol |
| DLP | Data Loss Prevention |
| DPI | Deep Pocket Inspection |
| ECG | Elastic Cloud Gateway |
| FTP | File Transfer Protocol |
| GCP | Google Cloud Platform |
| GDPR | General Data Protection Regulation (EU) |
| GRE | Generic Routing Encapsulation |
| HTTP | Hypertext Transfer Protocol |
| HTTPS | Hypertext Transfer Protocol Secure |
| ICMP | Internet Control Message Protocol |
| IdP | Identity Provider |
| IDP | Intrusion Detection Program |
| IKE | Internet Key Exchange - protocol used to set up a security association (SA) in the IPsec protocol suite |
| IMAP | Internet Message Access Protocol used to retrieve mail at the receiver's side |
| IOC | Indicator of compromise |
| IPS | Intrusion Prevention System |
| IPsec | Internet Protocol Security |
| JSON | JavaScript Object Notation |
| MTU | Maximum Transmission Unit |
| NAT | Network Address Translation |
| N-CASB | Netskope Cloud Access Security Broker |
| NG-SWG | Next Generation-Secure Web Gateway |
| PII | Personally Identifiable Information |
| POP | Point of Presence |
| P2P | Peer to Peer |
| RBAC | Role-Based Administration Controls |
| SaaS | Software as a Service |
| SASE | Secure Access Service Edge |
| SD-WAN | Software-Defined Wide Area Network |
| SDP | Software-Defined Perimeter |
| SIEM | Security Information and Event Management |
| SIP | Session Initiation Protocol |
| SMTP | Simple Mail Transfer Protocol |

| | |
|---|---|
| SSL | Secure Socket Layer |
| SWG | Secure Web Gateway |
| TCP | Transmission Control Protocol |
| TSS | Threat Scanning Service |
| UDP | User Datagram Protocol |
| UTM | Unified Threat Management |
| ZTNA | Zero Trust Secure Network Access |

Security services customers using the disclosed technology are able to specify which policy enforcement services apply for different types of tenant data, and to customize security policies for the data being transmitted via the devices of their organizations. In the context of this application, policy enforcement and security are used interchangeably in most contexts. An example system for managing a cloud-based policy enforcement system that unifies functions of packet-based and protocol-based access control and traffic inspection, threat detection and activity contextualization on inspectable and non-inspectable traffic is described next.

Architecture

FIG. 1 shows an architectural level schematic of a system 100 for providing a cloud-based policy enforcement system that unifies functions of packet-based and protocol-based access control and traffic inspection, threat detection and activity contextualization on inspectable and non-inspectable traffic. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes organization network 102, data center 152 with unified cloud-based security system 805, with security stack 153 with Netskope policy manager 157 and Netskope cloud access security broker (N-CASB) 155 and cloud-based services 108. System 100 includes multiple organization networks 104 for multiple subscribers, also referred to as multi-tenant networks, of a security services provider and multiple data centers 154. Organization network 102 includes computers 112a-n, tablets 122a-n, cell phones 132a-n and smart watches 142a-n.

In another organization network, organization users may utilize additional devices. Cloud services 108 includes cloud-based hosting services 118, web email services 128, video, messaging, and voice call services 138, streaming services 148, file transfer services 158, and cloud-based storage service 168. Data center 152 connects to organization network 102 and cloud-based services 108 via public network 145. Netskope cloud access security broker (N-CASB) 155, between cloud service consumers and cloud service providers, combines and interjects enterprise security policies as cloud-based resources are accessed. Unified cloud-based security system 805, with security stack 153 is also referred to as unified cloud-based policy enforcement system with policy enforcement stack in this document.

Continuing with the description of FIG. 1, disclosed unified cloud-based security system 805 is described in detail relative to FIG. 8 later and Netskope policy manager 157 is described in detail relative to FIG. 7 later. Enhanced Netskope cloud access security broker (N-CASB) 155 securely processes P2P traffic over BT, FTP and UDP-based streaming protocols as well as Skype, voice, video and messaging multimedia communication sessions over SIP, and web traffic over other protocols, in addition to governing access and activities in sanctioned and unsanctioned cloud apps, securing sensitive data and preventing its loss, and protecting against internal and external threats.

N-CASB 155 includes active analyzer 165 and introspective analyzer 175 that identify the users of the system and set policies for apps. Introspective analyzer 175 interacts directly with cloud-based services 108 for inspecting data at rest. In a polling mode, introspective analyzer 175 calls the cloud-based services using API connectors to crawl data resident in the cloud-based services and check for changes.

As an example, Box™ storage application provides an admin API called the Box Content API™ that provides visibility into an organization's accounts for all users, including audit logs of Box folders, that can be inspected to determine whether any sensitive files were downloaded after a particular date, at which the credentials were compromised. Introspective analyzer 175 polls this API to discover any changes made to any of the accounts. If changes are discovered, the Box Events API™ is polled to discover the detailed data changes.

In a callback model, introspective analyzer 175 registers with the cloud-based services via API connectors to be informed of any significant events. For example, introspective analyzer 175 can use Microsoft Office365 Webhooks API™ to learn when a file has been shared externally. Introspective analyzer 175 also has deep API inspection (DAPII), deep packet inspection (DPI), and log inspection capabilities and includes a DLP engine that applies the different content inspection techniques on files at rest in the cloud-based services, to determine which documents and files are sensitive, based on policies and rules stored in storage 186. The result of the inspection by introspective analyzer 175 is generation of user-by-user data and file-by-file data.

Continuing further with the description of FIG. 1, N-CASB 155 further includes monitor 184 that includes extraction engine 171, classification engine 172, security engine 173, management plane 174 and data plane 180. Also included in N-CASB 155, storage 186 includes content policies 187, content profiles 188, content inspection rules 189, enterprise data 197, information for clients 198 and user identities 199.

Enterprise data 197 can include organizational data, including but not limited to, intellectual property, non-public financials, strategic plans, customer lists, personally identifiable information (PII) belonging to customers or employees, patient health data, source code, trade secrets, booking information, partner contracts, corporate plans, merger and acquisition documents and other confidential data.

In particular, the term "enterprise data" refers to a document, a file, a folder, a webpage, a collection of webpages, an image, or any other text-based document. User identity refers to an indicator that is provided by the network security system to the client device, in the form of a token, a unique identifier such as a UUID, a public-key certificate, or the like. In some cases, the user identity can be linked to a specific user and a specific device; thus, the same individual can have a different user identity on their mobile phone vs. their computer. The user identity can be linked to an entry or corporate identity directory, but is distinct from it.

In one implementation, a cryptographic certificate signed by the network security is used as the user identity. In other implementations, the user identity can be solely unique to the user and be identical across devices.

Embodiments can also interoperate with single sign-on (SSO) solutions and/or corporate identity directories, e.g. Microsoft's Active Directory. Such embodiments may allow policies to be defined in the directory, e.g. either at the group or user level, using custom attributes. Hosted services configured with the system are also configured to require traffic via the system. This can be done through setting IP range restrictions in the hosted service to the IP range of the system and/or integration between the system and SSO systems.

For example, integration with a SSO solution can enforce client presence requirements before authorizing the sign-on. Other embodiments may use "proxy accounts" with the SaaS vendor—e.g. a dedicated account held by the system that holds the only credentials to sign in to the service. In other embodiments, the client may encrypt the sign on credentials before passing the login to the hosted service, meaning that the networking security system "owns" the password.

Storage 186 can store information from one or more tenants into tables of a common database image to form an on-demand database service (ODDS), which can be implemented in many ways, such as a multi-tenant database system (MTDS). A database image can include one or more database objects.

In other implementations, the databases can be relational database management systems (RDBMSs), object oriented database management systems (OODBMSs), distributed file systems (DFS), no-schema database, or any other data storing systems or computing devices.

In some implementations, the gathered metadata is processed and/or normalized. In some instances, metadata includes structured data and functionality targets specific data constructs provided by cloud services 108. Non-structured data, such as free text, can also be provided by, and targeted back to cloud services 108. Both structured and non-structured data are capable of being aggregated by introspective analyzer 175.

For instance, the assembled metadata is stored in a semi-structured data format like a JSON (JavaScript Object Notation), BSON (Binary JSON), XML, Protobuf, Avro or Thrift object, which consists of string fields (or columns) and corresponding values of potentially different types like numbers, strings, arrays, objects, etc. JSON objects can be nested and the fields can be multi-valued, e.g., arrays, nested arrays, etc., in other implementations.

These JSON objects are stored in a schema-less or NoSQL key-value metadata store 178 like Apache Cassandra™, Google's Bigtable™, HBase™, Voldemort™, CouchDB™ MongoDB™, Redis™, Riak™, Neo4j™, etc., which stores the parsed JSON objects using keyspaces that are equivalent to a database in SQL. Each keyspace is divided into column families that are similar to tables and comprise of rows and sets of columns.

In one implementation, introspective analyzer 175 includes a metadata parser (omitted to improve clarity) that analyzes incoming metadata and identifies keywords, events, user IDs, locations, demographics, file type, timestamps, and so forth within the data received. Parsing is the process of breaking up and analyzing a stream of text into keywords, or other meaningful elements called "targetable parameters".

In one implementation, a list of targeting parameters becomes input for further processing such as parsing or text mining, for instance, by a matching engine (not shown). Parsing extracts meaning from available metadata. In one implementation, tokenization operates as a first step of parsing to identify granular elements (e.g., tokens) within a stream of metadata, but parsing then goes on to use the context that the token is found in to determine the meaning and/or the kind of information being referenced. Because metadata analyzed by introspective analyzer 175 are not homogenous (e.g., there are many different sources in many different formats), certain implementations employ at least one metadata parser per cloud service, and in some cases more than one.

In other implementations, introspective analyzer 175 uses monitor 184 to inspect the cloud services and assemble content metadata. In one use case, the identification of sensitive documents is based on prior inspection of the document. Users can manually tag documents as sensitive, and this manual tagging updates the document metadata in the cloud services. It is then possible to retrieve the document metadata from the cloud service using exposed APIs and use them as an indicator of sensitivity.

Continuing further with the description of FIG. 1, system 100 can include any number of cloud-based services 108: point to point streaming services, hosted services, cloud applications, cloud stores, cloud collaboration and messaging platforms, and cloud customer relationship management (CRM) platforms.

The services can include peer-to-peer file sharing (P2P) via protocols for portal traffic such as BitTorrent (BT), user data protocol (UDP) streaming and file transfer protocol (FTP); voice, video and messaging multimedia communication sessions such as instant message over Internet Protocol (IP) and mobile phone calling over LTE (VoLTE) via the Session Initiation Protocol (SIP) and Skype. The services can handle Internet traffic, cloud application data, and generic routing encapsulation (GRE) data.

A network service or application, or can be web-based (e.g., accessed via a uniform resource locator (URL)) or native, such as sync clients. Examples include software-as-a-service (SaaS) offerings, platform-as-a-service (PaaS) offerings, and infrastructure-as-a-service (IaaS) offerings, as well as internal enterprise applications that are exposed via URLs. Examples of common cloud-based services today include Salesforce.com™, Box™, Dropbox™, Google Apps™, Amazon AWS™, Microsoft Office 365™, Workday™, Oracle on Demand™, Taleo™, Yammer™, Jive™, and Concur™

In the interconnection of the elements of system 100, network 145 couples computers 112*a-n*, tablets 122*a-n*, cell phones 132*a-n*, smart watches 142*a-n*, cloud-based hosting service 118, web email services 128, video, messaging and voice call services 138, streaming services 148, file transfer services 158, cloud-based storage service 168 and N-CASB 155 in communication. The communication path can be point-to-point over public and/or private networks. Communication can occur over a variety of networks, e.g. private networks, VPN, MPLS circuit, or Internet, and can use appropriate application program interfaces (APIs) and data interchange formats, e.g. REST, JSON, XML, SOAP and/or JMS. All of the communications can be encrypted.

This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi, and WiMAX. Additionally, a variety of authorization and authentication techniques, such as username/password, OAuth, Kerberos, SecureID, digital certificates, and more, can be used to secure the communications.

Further continuing with the description of the system architecture in FIG. 1, N-CASB 155 includes monitor 184 and storage 186 which can include one or more computers and computer systems coupled in communication with one another. They can also be one or more virtual computing and/or storage resources.

For example, monitor 184 can be one or more Amazon EC2 instances and storage 186 can be Amazon S3™ storage. Other computing-as-service platforms such as Rackspace, Heroku or Force.com from Salesforce could be used rather than implementing N-CASB 155 on direct physical computers or traditional virtual machines. Additionally, one or more engines can be used and one or more points of presence (POPs) can be established to implement the security functions.

The engines or system components of FIG. 1 are implemented by software running on varying types of computing devices. Example devices are a workstation, a server, a computing cluster, a blade server, and a server farm, or any other data processing system or computing device. The engine can be communicably coupled to the databases via a different network connection.

For example, extraction engine 171 can be coupled via network(s) 145 (e.g., the Internet), classification engine 172 can be coupled via a direct network link and security engine 173 can be coupled by yet a different network connection. For the disclosed technology, the data plane 180 POPs are hosted on the client's premises or located in a virtual private network controlled by the client.

N-CASB 155 provides a variety of functions via a management plane 174 and a data plane 180. Data plane 180 includes an extraction engine 171, a classification engine 172, and a security engine 173, according to one implementation. Other functionalities, such as a control plane, can also be provided. These functions collectively provide a secure interface between cloud services 108 and organization network 102.

Although we use the term "network security system" to describe N-CASB 155, more generally the system provides application visibility and control functions as well as security. In one example, thirty-five thousand cloud applications are resident in libraries that intersect with servers in use by computers 112*a-n*, tablets 122*a-n*, cell phones 132*a-n* and smart watches 142*a-n* in organization network 102.

Computers 112*a-n*, tablets 122*a-n*, cell phones 132*a-n* and smart watches 142*a-n* in organization network 102 include management clients with a web browser with a secure web-delivered interface provided by N-CASB 155 to define and administer content policies 187, according to one implementation. N-CASB 155 is a multi-tenant system, so a user of a management client can only change content policies 187 associated with their organization, according to some implementations. In some implementations, APIs can be provided for programmatically defining and or updating policies.

In such implementations, management clients can include one or more servers, e.g. a corporate identities directory such as a Microsoft Active Directory, pushing updates, and/or responding to pull requests for updates to the content policies 187. Both systems can coexist; for example, some companies may use a corporate identities directory to automate identification of users within the organization while using a web interface for tailoring policies to their needs. Management clients are assigned roles and access to the N-CASB 155 data is controlled based on roles, e.g. read-only vs. read-write.

In addition to periodically generating the user-by-user data and the file-by-file data and persisting it in metadata store 178, an active analyzer and introspective analyzer (not shown) also enforce security policies on the cloud traffic.

For further information regarding the functionality of active analyzer and introspective analyzer, reference can be made to, for example, commonly owned U.S. Pat. No. 9,398,102 (NSKO 1000-2); U.S. Pat. No. 9,270,765 (NSKO 1000-3); U.S. Pat. No. 9,928,377 (NSKO 1001-2); and U.S. *patent* application Ser. No. 15/368,246 (NSKO 1003-3); Cheng, Ithal, Narayanaswamy and Malmskog *Cloud Security For Dummies, Netskope Special Edition*, John Wiley & Sons, Inc. 2015; *"Netskope Introspection"* by Netskope, Inc.; *"Data Loss Prevention and Monitoring in the Cloud"* by Netskope, Inc.; *"Cloud Data Loss Prevention Reference Architecture"* by Netskope, Inc.; *"The 5 Steps to Cloud Confidence"* by Netskope, Inc.; *"The Netskope Active Platform"* by Netskope, Inc.; *"The Netskope Advantage: Three "Must-Have" Requirements for Cloud Access Security Brokers"* by Netskope, Inc.; *"The 15 Critical CASB Use Cases"* by Netskope, Inc.; *"Netskope Active Cloud DLP"* by Netskope, Inc.; *"Repave the Cloud-Data Breach Collision Course"* by Netskope, Inc.; and *"Netskope Cloud Confidence Index™"* by Netskope, Inc., which are incorporated by reference for all purposes as if fully set forth herein.

For system 100, a control plane may be used along with or instead of management plane 174 and data plane 180. The specific division of functionality between these groups is an implementation choice. Similarly, the functionality can be highly distributed across a number of points of presence (POPs) to improve locality, performance and/or security.

In one implementation, the data plane is on premises or on a virtual private network and the management plane of the network security system is located in cloud services or with corporate networks, as described herein. For another secure network implementation, the POPs can be distributed differently.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer readable medium such as a computer readable storage medium that stores computer readable instructions or computer program code, or as a computer program product comprising a computer usable medium having a computer readable program code embodied therein.

The technology disclosed can be implemented in the context of any computer-implemented system including a database system or a relational database implementation like an Oracle™ compatible database implementation, an IBM DB2 Enterprise Server™ compatible relational database implementation, a MySQL™ or PostgreSQL™ compatible relational database implementation or a Microsoft SQL Server™ compatible relational database implementation or a NoSQL non-relational database implementation such as a Vampire™ compatible non-relational database implementation, an Apache Cassandra™ compatible non-relational database implementation, a BigTable™ compatible non-relational database implementation or an HBase™ or DynamoDB™ compatible non-relational database implementation.

In addition, the technology disclosed can be implemented using different programming models like MapReduce™, bulk synchronous programming, MPI primitives, etc. or different scalable batch and stream management systems like Amazon Web Services (AWS)™, including Amazon Elasticsearch Service™ and Amazon Kinesis™, Apache Storm™ Apache Spark™, Apache Kafka™, Apache Flink™, Truviso™, IBM Info-Sphere™, Borealis™ and Yahoo! S4™

Figure 2:
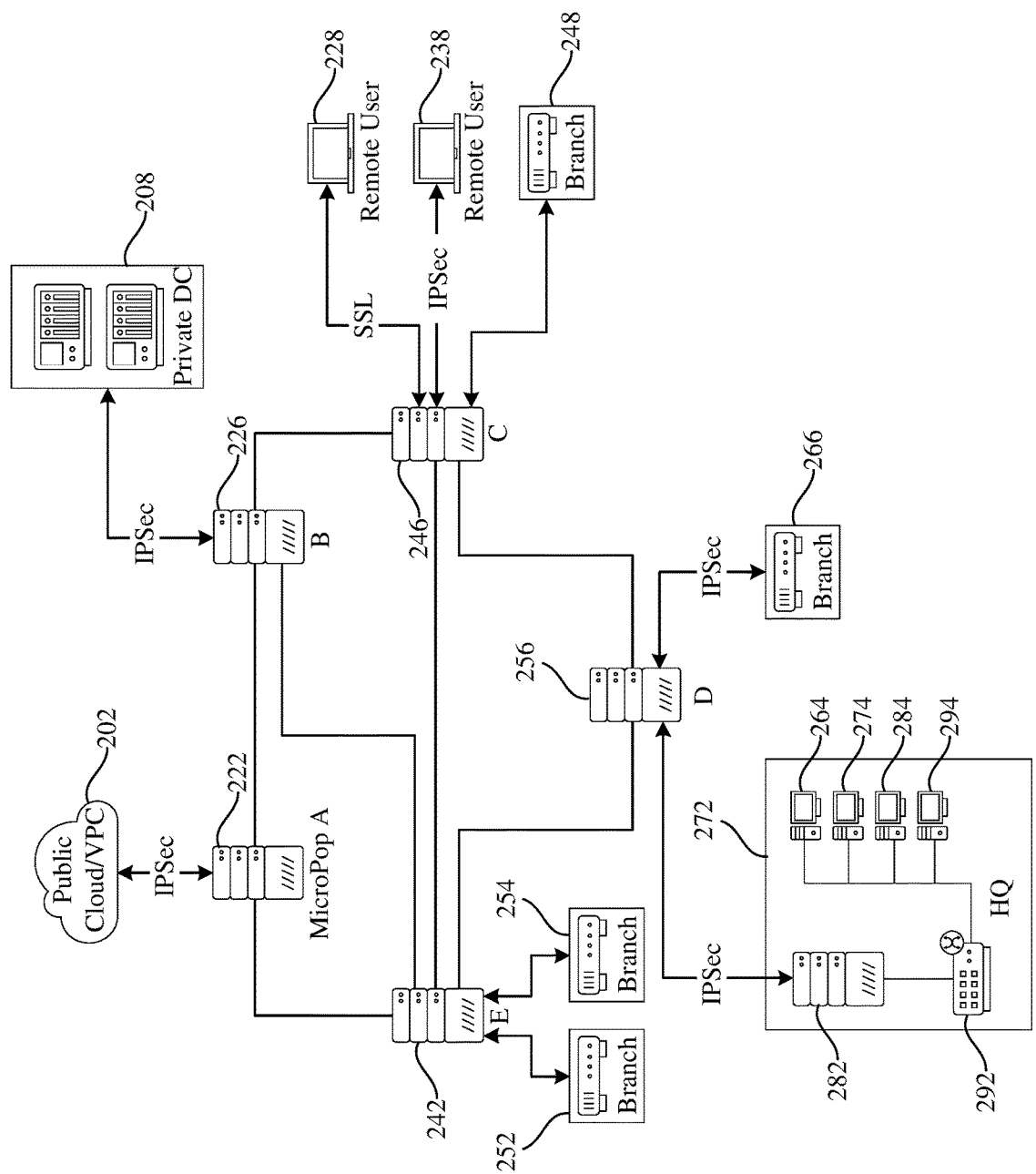
FIG. 2 shows a block diagram for an example distributed network of secure services.

FIG. 2 shows an example block diagram for a distributed network of secure services for data centers. The network includes security headquarters 272, points of presence (POPs) 222, 226, 242, 246 and 256, public cloud/virtual private cloud 202, private data center 208, remote users 228, 238 and branch offices 252, 254, 248, 266 which are multi-user aggregations. Security headquarters 272 utilizes IPsec protocol for the security association (SA), and includes servers 282 and network device 292 that connects end devices 264, 274, 284 and 294, which can be any of computers, tablets, cell phones, smart watches or other devices not explicitly listed here.

Points of presence (POP) 222, 226, 242, 246 and 256 implement data centers, which refers to locations at which servers or network equipment is present. POP can be referred to as a cluster or set of nodes, where a node refers to a physical machine running multiple pods. In one implementation, one node runs two to three pods, which each include a set of containers which run processes.

Three to four containers run in a pod and a single process runs in a container, in one implementation. Each process runs a set of threads, often with one core provisioned per thread. In another example case, configurations with different numbers of pods and containers and processes can be configured in the distributed system.

In the FIG. 2 example, Micro Pop A 222 connects via IPSec to public cloud or virtual private cloud 202 and connects to POP B 226 and POP E 242. POP B 226 includes IPSec access to private data center 208 and is one of the set of nodes that also includes POP C 246 and POP E 242. POP C 246 connects via SSL/IPSec with remote users 228, 238 and with branch service 248. POP D 256 is a node in the cluster with Micro POP C 246, Micro POP E 242 and headquarters 272. POP D 256 also includes branch service 266 which connects via IPSec.

Figure 3:
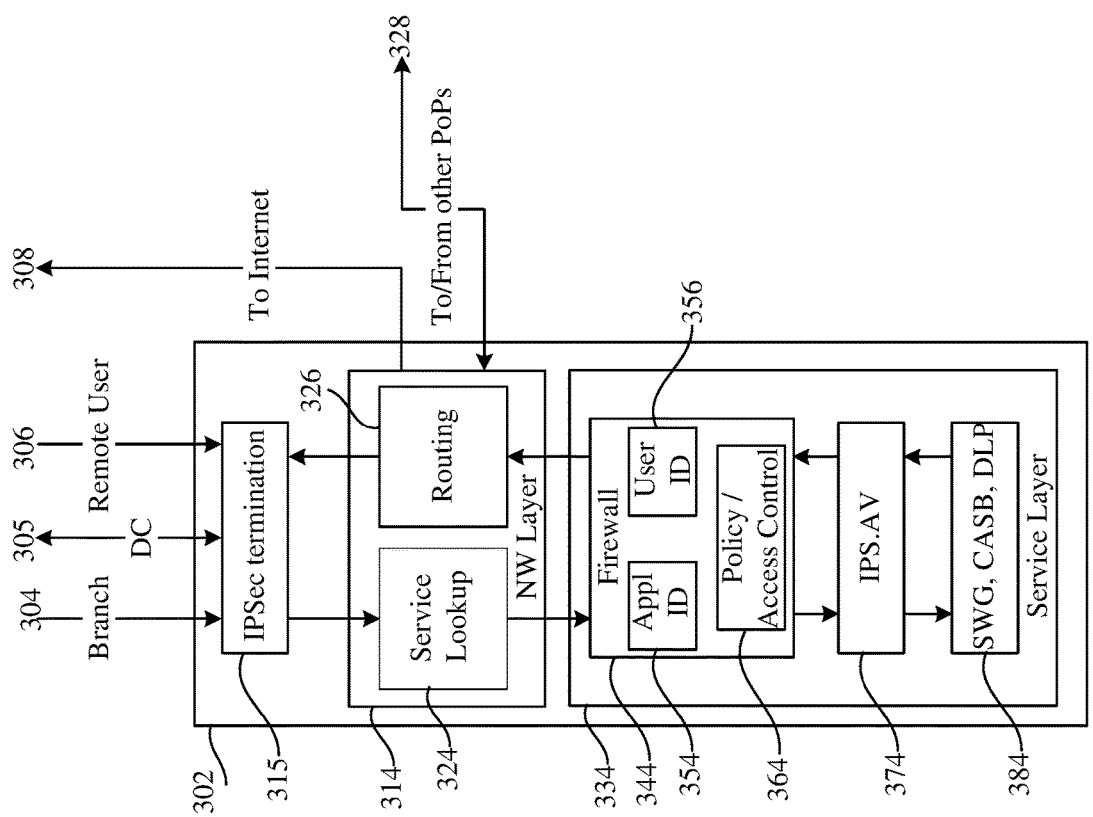
FIG. 3 illustrates disclosed policy enforcement layers for managing a cloud-based policy enforcement system that unifies functions of access control and traffic inspection, threat detection, activity contextualization and data loss prevention analysis on inspectable and non-inspectable traffic.

FIG. 3 illustrates disclosed policy enforcement layers for a cloud-based policy enforcement system that unifies functions of packet-level and protocol-level access control and traffic inspection, threat detection, activity contextualization and data loss prevention analysis on inspectable and non-inspectable traffic.

The disclosed policy enforcement layers address the concern of traffic traveling outside of an enterprise data center, and whether the user is behind a corporate firewall by delivering consistent visibility and enforcement of security policy. The cloud-based policy enforcement system includes the delivery of networking and security services for traffic en route to the Internet, cloud applications or the data center. When users access applications, the packet has an entry point at a secure access service edge (SASE) and an SASE egress exit point.

Packets flow through several logical components and boundaries in system 302, where multiple security functions offer identity-based secure access, delivering cloud-based security services. Streams of data can arrive at IPSec termination 315 in POP 302 from a branch server 304, from data center 305 or from remote user 306. The user could be in any of a number of different locations, such as the office or at home, and need to use a cloud-based application. For that case, the user's request to access an application traverses a local area network to the network's edge. For users working from home, the user and the network edge are in the same building, in one example.

Continuing the description of FIG. 3, IPSec termination 315 routes to network layer 314 for service lookup 324, and network layer 314 routes all traffic for all protocols to firewall 344, based on service lookup 324 results for service layer 334 and routes secure packets to the Internet 308 and to and from other points of presence (POPs) 328.

Firewall 344 utilizes IP range, expressible via a compact representation of an IP address and its associated routing prefix (CIDR) for the network mask, using application ID 354 and user ID 356 for determining policy and access control 364 for users and maps packet streams to intrusion prevention system (IPS) anti-virus (AV) 374. Service layer 334 includes secure web gateway (SWG) for all web apps, CASB for cloud apps and data loss prevention (DLP) 384, thereby using a single gateway to achieve network security.

Figure 4:
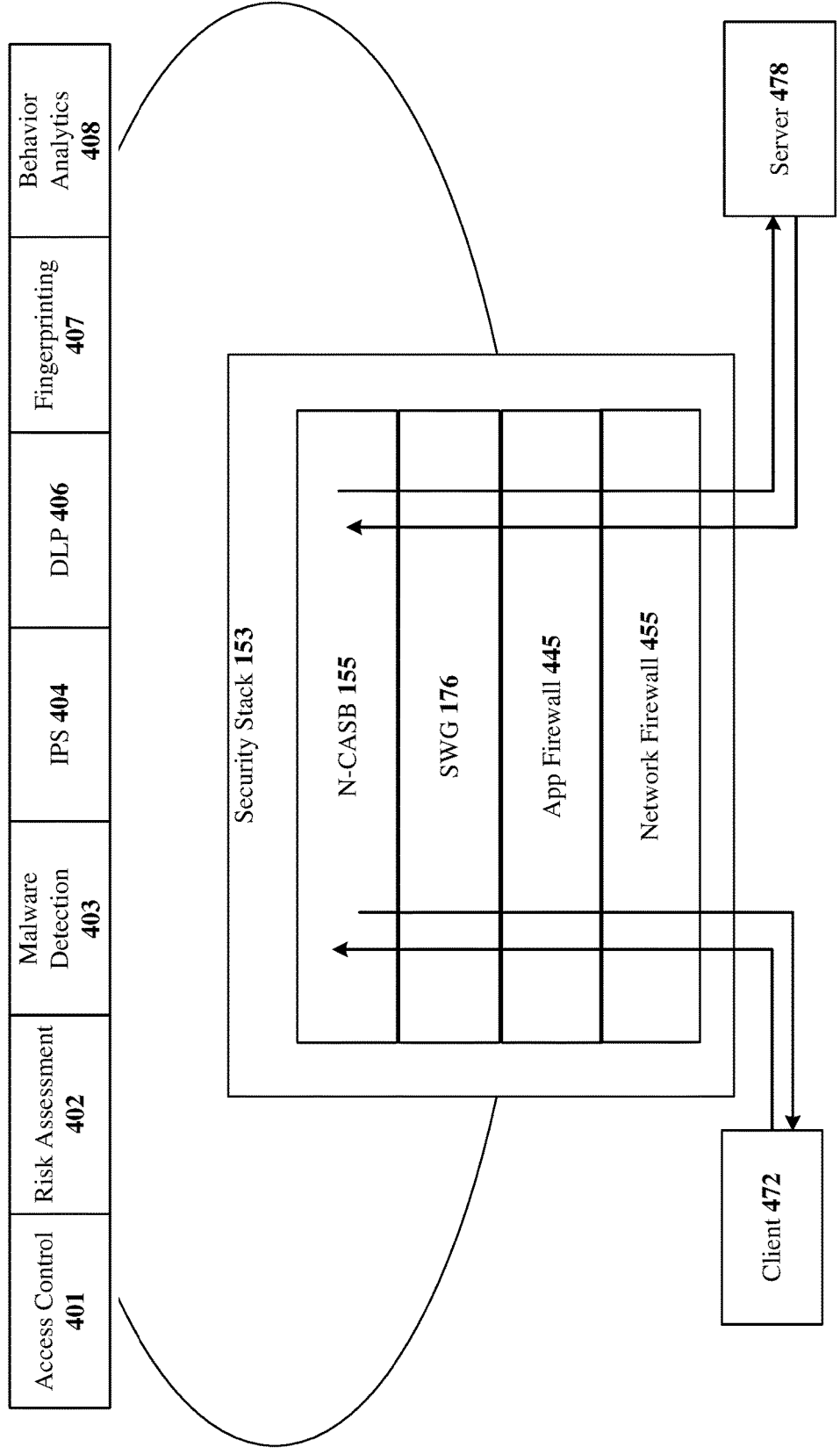
FIG. 4 illustrates the disclosed policy enforcement stack with a comprehensive suite of policy enforcement components and an example logical traffic flow for the cloud-based policy enforcement system that unifies functions of packet-level and protocol-level access control and traffic inspection, threat detection and activity contextualization on inspectable and non-inspectable traffic, for one embodiment of the disclosed technology.

FIG. 4 illustrates the disclosed security stack with a comprehensive suite of policy enforcement components and an example logical traffic flow for the disclosed cloud-based security system that unifies functions of packet-level and protocol-level access control and traffic inspection, threat detection and activity contextualization on inspectable and non-inspectable traffic, for one implementation of the disclosed technology.

Security stack 153 layers include network firewall 455, app firewall 445, secure web gateway (SWG) 176 and N-CASB 155 in one embodiment. Network firewall 455 analyzes IP packets and connections to detect anomalies and apply policies based on packet headers. App firewall 445 analyzes application protocols and streams of data to detect protocol anomalies for HTTP/S and other network protocols, such as server message block (SMB), file transfer protocol (FTP), simple mail transfer protocol (SMTP) and domain name service (DNS). SWG 176 analyzes web operations to detect anomalies in the data and prevent access to unsanctioned and dangerous websites.

N-CASB 155 can control web applications and operations like login, file transfer and sharing and detect anomalies in the data and accesses. Security functions include access control 401, risk assessment 402, malware detection 403, Intrusion Prevention System (IPS) 404, data loss prevention (DLP) 406, fingerprinting 407 and behavior analytics 408 and can include additional policy enforcement features. Access control 401 can be applied to any type of traffic and be based on multiple criteria. Risk assessment 402 applies to all traffic based on destination accessed. Malware detection 403 assesses security of inspectable and decrypted traffic. IPS 404 gets applied to decrypted and non-decrypted traffic, assessing signatures of packet flow/message exchange that are abnormal or misdirected. DLP 406 performs security functions on decrypted files. Fingerprinting 407 executes a file level hash for decrypted protocols, Behavior analytics 408 analyzes any traffic, varying based on the amount of information that can be collected for a session.

Continuing the description of FIG. 4, traffic travels from client 472 up and down through the layers of security stack 153 to server 478. Each security layer can detect issues and enforce policies when it first sees the traffic, on the way up security stack 153, or after an upper layer has done some processing on the traffic, so on the way down, in various implementations of security policies. For example, App firewall 445 can detect HTTP/S protocol issues for traffic routed between client 472 and server 478, at SWG 176/N-CASB 155 or at SWG 176/N-CASB 155.

Further continuing the description of FIG. 4, response traffic flows from server 478 to client 472, through the layers of security stack 153, being handed off for detecting issues and enforcing policies at the security layers network firewall 455, app firewall 445, SWG 176 and N-CASB 155. The policy enforcement can be applied when security stack 153 receives the response from server 478.

In one example, app firewall 445 may find malicious content returned from server 478 that may cause the response to be put in a restrictive state. Similarly, the N-CASB 155 may detect sensitive data in a file download, which will be in the response to a download activity. That is, an incoming access request can pass all the service checks, but the response can fail a check and cause a restrictive action.

Particular information that can only be discovered by certain security layers is passed along the chain of security features so that enforcement can be done at any layer whenever the full set of policy criteria matching can be completed.

For example, if user info for certain traffic can be discovered only by N-CASB 155 after proxying and decrypting the traffic, network firewall 455 could combine that discovered information with other packet header info to enforce the policy after the packet stream has gone through N-CASB 155.

Vice versa, info, from the lower security layers in the stack, can be discovered and passed to upper layers, and the upper layers can then complete the security enforcement. Depending on the traffic type, traffic might not go all the way up to N-CASB 155. Cloud app traffic goes through the full complement of network security layers in the stack. Other web traffic goes up to SWG 176. Non-HTTP/S traffic is examined at app firewall 445. Each layer of security stack 153 can apply the policy enforcement functions on the traffic it sees.

Examples are described next of security features applied to various traffic types.

Network firewall 455 controls access based on packet header fields, and applies risk assessment to traffic based on the destination accessed, as specified by the destination IP, port and protocol. Network firewall 455 can share IP addresses, TCP/UDP ports, protocol, VLAN and priority.

The disclosed security system of cloud-based components enforces security policies in multiple scenarios. The security system routes data packets for inspection for detecting malformed packet headers, malicious signatures and incoming access requests directed to threat destinations, and for recognizing and processing content-containing activity, to classify the activity as compromising or not. In one scenario, packet streams traverse the full set of layers of cloud-based components, some of which may take no action for a packet stream. In another scenario, packet streams can be selectively directed through the cloud-based components that apply to the type of data in the packets. Responses are also routed through the full set of layers of cloud-based components, in some scenarios.

Disclosed Netskope policy manager 157 manages packet flow, and matches traffic to policy rules. Policy manager is configured to validate, save and distribute policy specifications applicable to respective functions among cloud-based unified functions for packet-level and protocol-level access control and traffic inspection, threat detection and activity contextualization on inspectable and non-inspectable traffic.

A unified policy is represented using a set of policy fields for
 (a) source of traffic to be inspected,
 (b) destination of the traffic,
 (c) protocol used by the traffic,
 (d) activity specified in inspectable traffic,
 (e) profile for a particular function and
 (f) action to be triggered in case of exception resulting from inspection.

Values for (a) a source or (b) destination of traffic to be inspected include any traffic, a specified user, a specified group, an IP address or range, or a port number. For (c) a protocol used by the traffic, values include HTTP, TCP, UDP, or ICMP.

Values for (d) an activity specified in inspectable traffic include upload, download, preview or share, and values for (e) profile for a particular function, one or more of the access control and traffic inspection, the threat detection, the activity contextualization and the data loss prevention analysis.

Additionally, values for (f) for an action to be triggered in case of exception resulting from inspection include allow, block, alert, bypass, coach or quarantine. In some cases configured policies for the action of blocking can be applied to uploads and downloads, and in other cases the configured policy for block can be applied to only uploads or only downloads.

Figure 5:
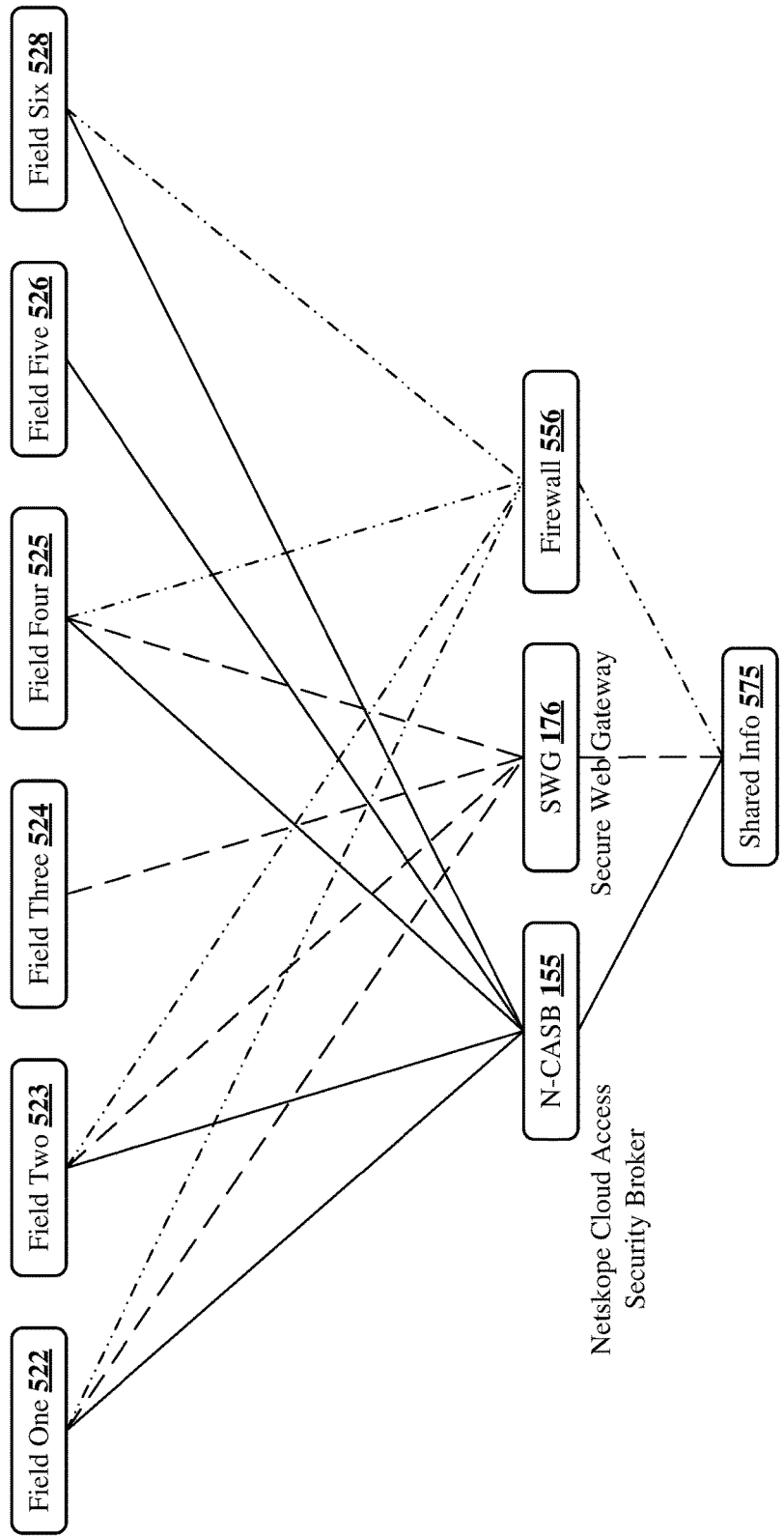
FIG. 5 shows examples of common fields for expressing a unified policy in the disclosed cloud-based policy enforcement system that unifies functions of packet-level and protocol-level access control and traffic inspection, threat detection and activity contextualization on inspectable and non-inspectable traffic.

FIG. 5 shows examples of common fields for expressing a unified policy in the disclosed cloud-based security system that unifies functions of packet-level and protocol-level access control and traffic inspection, threat detection and activity contextualization and inspection on potentially inspectable and non-inspectable traffic.

Data manager 715 handles a superset of fields 522, 523, 524, 525, 526, 528 used to specify security policies, including common fields shared by two or more of the unified functions across the cloud-based unified functions of N-CASB 155, secure web gateway (SWG) 176 and firewall 556. Multiple source fields can be in use for a particular packet. Example policy fields are listed next.
 Src [user, group, organizational unit, IP/port, . . . ]
 Dst [App, category, IP/port, domain, . . . ]
 Protocol {TCP, UDP, ICMP, . . . }
 Activity [upload, download, preview, . . . ]
 Action [allow, block, alert, bypass, quarantine, coach, . . . ]

Multiple cloud-based security functions can generate an action, such as allow, block, alert, bypass, quarantine, coach, and encrypt, as listed earlier.

A summary, in table form, of usage of example policy fields for expressing unified policy for multiple cloud-based security functions is described next, with criteria for actions listed across the top.

N-CASB 155 can match on the source (Src), destination application (Dst App), destination (Dst) IP/port/domain, activity and profile fields for HTTP/S traffic and apply an action.

Secure web gateway (SWG) 176 can match on all Src/Dst fields, and activity and profile, apart from Dst app, for HTTP/S traffic, and apply an action.

Firewall 556, which can represent a combination of the unified functions for app firewall 445 and network firewall 455, can match on the Src/Dst fields, apart from Dst category, for all traffic and for non-HTTP/S profiles, and apply an action.

| | Src | Dst App | Dst Category | Dst IP/port/domain | Protocol | Activity | Profile |
|---|---|---|---|---|---|---|---|
| N-CASB | Y | Y | N | Y | HTTP/S | Y | Y |
| SWG | Y | N | Y | Y | HTTP/S | N | Y |
| FW | Y | Y | N | Y | All | N | Y for non-HTTP/S |

In a first example, the unified policy allows users to access Office365, a set of applications that have both HTTP/S and non-HTTP/S traffic, so both N-CASB 155 and firewall 556 would try to match traffic with Office365, depending on the protocol, and apply the action. SWG 176 will also categorize traffic as safe and allow it. The rule for this policy is listed next.

Src=any, dst=O365, protocol=any, action=allow

In a second example, the unified policy in the rule is a specific DLP profile such as DLP PII Profile, which allows users to use storage apps but do DLP of certain content on download activity. The rule for this policy is listed next.

Src=any, category=storage, protocol any, activity=download, profile=DLP, action=block SWG 176 will inspect to determine if HTTP/S traffic is for some storage app and N-CASB 155 will do DLP because the activity field is set. The category is shared with N-CASB 155 and N-CASB 155 will do DLP on download activities to prevent personally identifiable information (PII) from being transferred.

In a third example, the unified policy allows certain users to access Google Apps. The rule for this policy is listed next.

Src=user group 1, dst app=Google apps, protocol any, activity=any, profile=any, action=allow.

N-CASB 155 will identify users and all Google apps HTTP/S traffic for them. The user info will be shared with firewall 556 so that firewall 556 can allow those users to access Google non-HTTP/S services also.

FIG. 6 shows a representative graphical user interface (GUI) 600 usable for configuring policy specifications for the disclosed cloud-based policy enforcement system that unifies functions of access control and traffic inspection, threat detection and activity contextualization on inspectable and non-inspectable traffic.)

GUI 600 can present the common fields in a consistent order with consistent value completion options across the unified functions, contextualized to required fields for specification of policies used by particular functions and can cause delivery of the GUI to a user of the cloud-based policy enforcement system.

GUI 600 can represent the normalization across protocols of policies and service provider dialects, so that policy definitions can be uniformly represented. User interface can be utilized for entering real-time protection policy 624 for an enterprise. In one example, firewall 644 can be added as the source of non-HTTP/S traffic to an application TCP 54000, with a policy action to allow the flow of the non-HTP/S packets.

Policy names can represent specific sets of policies, as shown in examples one through six of GUI 600. Activities and actions available at the GUI are dependent on the type of profile and application selected. A rule can be a firewall defined by a subnet, and the destination can be an application such as TCP 54000 with configurable activities and constraints, and with a profile and action configured for packets, such as "allow". Each policy can be assigned a unique name and the policy can be enabled or disabled, as an organization specifies. The GUI can display a pulldown menu for adding a firewall or other component.

Figure 7:
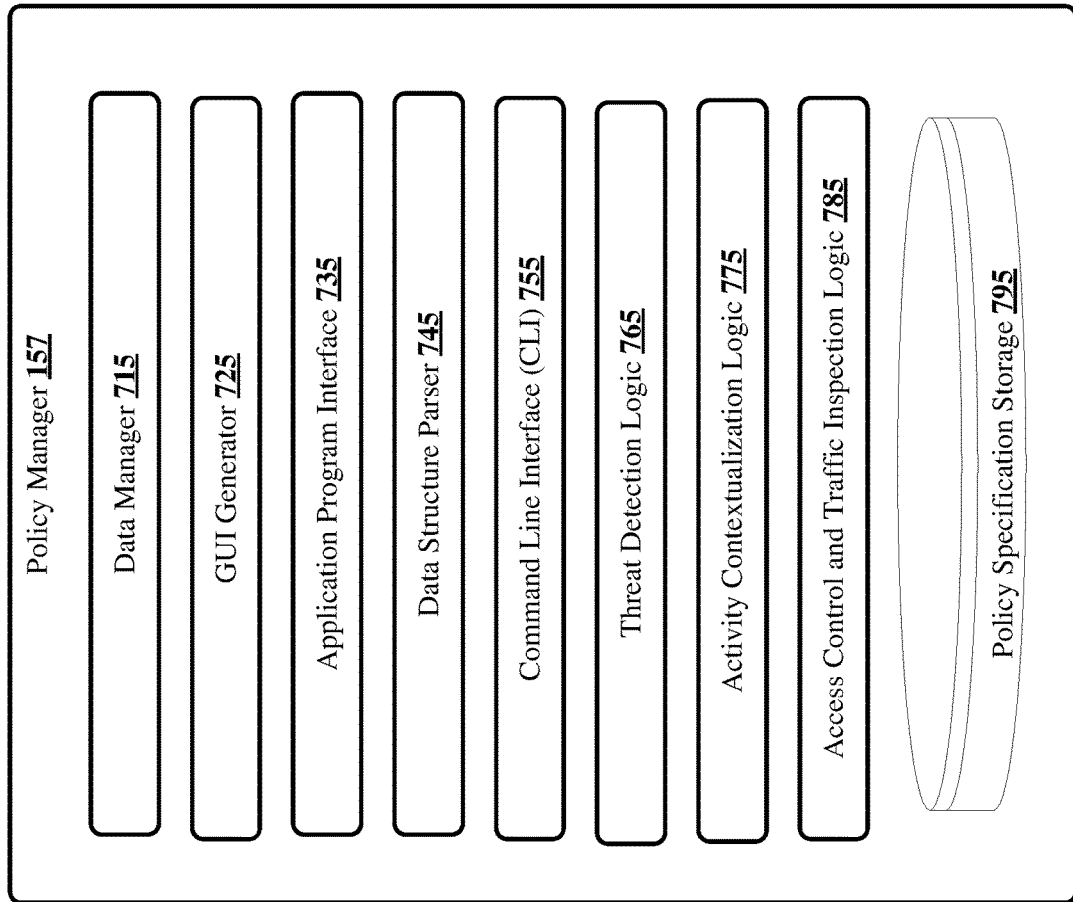
FIG. 7 shows a block diagram for the disclosed policy manager device for a cloud-based policy enforcement system that unifies policy enforcement functions.

FIG. 7 shows a block diagram 700 for the disclosed policy manager device for a cloud-based policy enforcement system that unifies policy enforcement functions. Policy manager 157 is utilized to validate, save and distribute policy specifications applicable to respective functions among the unified functions of packet-based and protocol-based access control and traffic inspection, threat detection and activity contextualization on inspectable and non-inspectable traffic.

Policies can be distributed to respective backend services, using JSON unified policy parsed such that it produces three different instruction sets for the packet-based and protocol-based access control and traffic inspection, threat detection and activity contextualization. Each functional component can receive the full list of the configured unified policy. Customers at organizations can customize the parsing logic and thereby their policy expression, in one implementation.

Block diagram 700 includes disclosed policy manager device 157, with data manager 715, graphical user interface (GUI) generator 725, application program interface (API) 735, data structure parser 745, command line interface (CLI) 755, threat detection logic 765, activity contextualization logic 775, access control and traffic inspection logic 785 and policy specification storage 795.

Policy manager 157 is configured to validate, save and distribute policy specifications applicable to respective functions among the unified functions of packet-level and protocol-level access control and traffic inspection, threat detection and activity contextualization. Policy manager 157 utilizes common fields such as source of traffic to be inspected, destination of the traffic, protocol used by the traffic, category of the traffic, activity specified in inspectable traffic, profile for a particular function and action to be triggered in case of exception resulting from inspection, as described earlier.

Values for these common fields include, for a source or destination of traffic to be inspected: an IP address or range or a port number; for a protocol used by the traffic: HTTP, TCP, UDP and ICMP. Additional values for a source or destination of traffic to be inspected include are dst hostnames, dst domain names, src user, src organizational group and src country. Values for category of the traffic can include business, finance, storage, collaboration and email, among others.

Values for an activity specified in inspectable traffic include upload, download, preview or share. For profile for a particular function, values include one or more of the access control and traffic inspection, the threat detection and the activity contextualization. Values for the action to be triggered in case of exception resulting from inspection include allow, block, alert, bypass, encrypt, coach or quarantine. Additional values can be included, such as 'allow with granular controls'.

Data manager 715 handles fields used to specify policies across the cloud-based unified functions, including common fields shared by two or more of the unified functions, and stores policy specifications applicable to respective functions among the unified functions in policy specification storage 795. Policy manager 157 is configurable to preserve the state of packet streams in a global cache and/or in a cache local to the cloud-based component.

Continuing the description of the blocks of FIG. 7, policy manager 157 can receive policy specifications via GUI generator 725, which presents the common fields in a consistent order with consistent value completion options across the unified functions, contextualized to required fields for specification of policies used by particular functions.

In another case, policy manager 157 receives policy specifications via an API interface 735 configured to receive a data structure of key-value pairs in which required fields used by particular functions are contextualized to each of the unified functions with consistent key tags and consistent value completion options across the unified functions.

In a third example, policy manager 157 receives policy specifications via data structure parser 745 which is configured to receive a data structure in which required fields used by particular functions are contextualized to each of the unified functions with consistent field names and consistent field value options across the unified functions.

In yet another example, command line interface (CLI) 755 is configured to accept and parse policy configuration commands used to populate a data structure of key-value pairs in which required fields used by particular functions are contextualized to each of the unified functions with consistent key tags and consistent value completion options across the unified functions. In another implementation, the data structure can utilize a different data representation for storing data security policy configurations.

Further continuing the description of the blocks of FIG. 7, access control and traffic inspection logic 785 is configured to inspect packet headers in an incoming access request for malformation, with or without any prior processing, and classify the incoming access request as inspectable or non-inspectable. Then, based on the inspection, access control and traffic inspection logic 785 sets a first restrictive state or pass the incoming access request.

Access control and traffic inspection logic 785 can also be configured to perform deep packet inspection on the incoming access request for malicious signatures, with or without any prior processing, and can be configured to set a second restrictive state or pass the incoming access request. Threat detection logic 765 is configured, when the incoming access request is an HTTP/S stream, to classify the incoming access request as directed to a threat destination or not, then based on the classifying, can be configured to set a third restrictive state or pass the incoming access request.

Activity contextualization logic 775 is configured, when the incoming access request is an HTTP/S stream seeking access to a cloud-based application, to recognize and process content-containing activity, to classify the activity as compromising or not. Then, based on the classifying, activity contextualization logic 775 can be configured to set a fourth restrictive state or pass the incoming access request.

Policy manager 157 can be configured to route packets through the components of security stack 153, some of which take no action, or can be configured to route packets selectively through the layers that apply to the type of access request being inspected. In one example, the configuration of policy manager 157, which can be stored in policy specification storage 795, can specify that packets traverse the security stack 153 up from client 472, through network firewall 455, through app firewall 445, SWG 176 and N-CASB 155, and then back through SWG 176, app firewall 445 and network firewall 455 before an action is taken.

In a different configuration, an action, such as blocking the packet, alerting of detected issues, or quarantining of packets, or coaching can be taken upon encountering a first exception. Coach actions in SWG and N-CASB can be utilized to ascertain "that's not allowed, use X instead" or "that's not allowed by default, but the user can supply a justification if they need to use it", in one embodiment. Yet another action can be requiring authentication or multi-factor authentication depending on the traffic context. Further, the combined components of security stack 153 can motivate changing the level of authentication required.

For a different configuration of policy manager 157, packets can be routed selectively through layers that apply to that type of packets, with the state of the results of respective inspections and classifications stored in restrictive states.

Access control and traffic inspection logic 785 is configured to inspect packet headers in an incoming access request for malformation, with or without any prior processing, and classify the incoming access request as inspectable or non-inspectable, then based on the inspection, to set a first restrictive state or pass the incoming access request.

Access control and traffic inspection logic 785 is also configured to perform deep packet inspection on the incoming access request for malicious signatures, with or without any prior processing, configured to set a second restrictive state or pass the incoming access request.

Threat detection logic 765 is configured, when the incoming access request is an HTTP/S stream, to classify the incoming access request as directed to a threat destination or not, then based on the classifying, configured to set a third restrictive state or pass the incoming access request. activity contextualization logic 775 is configured, when the incoming access request is an HTTP/S stream seeking access to a cloud-based application, to recognize and process content-containing activity, to classify the activity as compromising or not, then based on the classifying, configured to set a fourth restrictive state or pass the incoming access request. State information can be stored in the layer to which the restrictive state applies, can be passed as a message to a subsequent component, and can also be stored in a common database for states.

Policy manager 157 works across mobile, laptop, office and other devices, to enforce a single unified policy across device types and locations. N-CASB, network firewall, app firewall and SWG can be run separately, with coordinated application of policy, utilizing a single engine that passes the policy to the set of configured, enabled security services.

Figure 8:
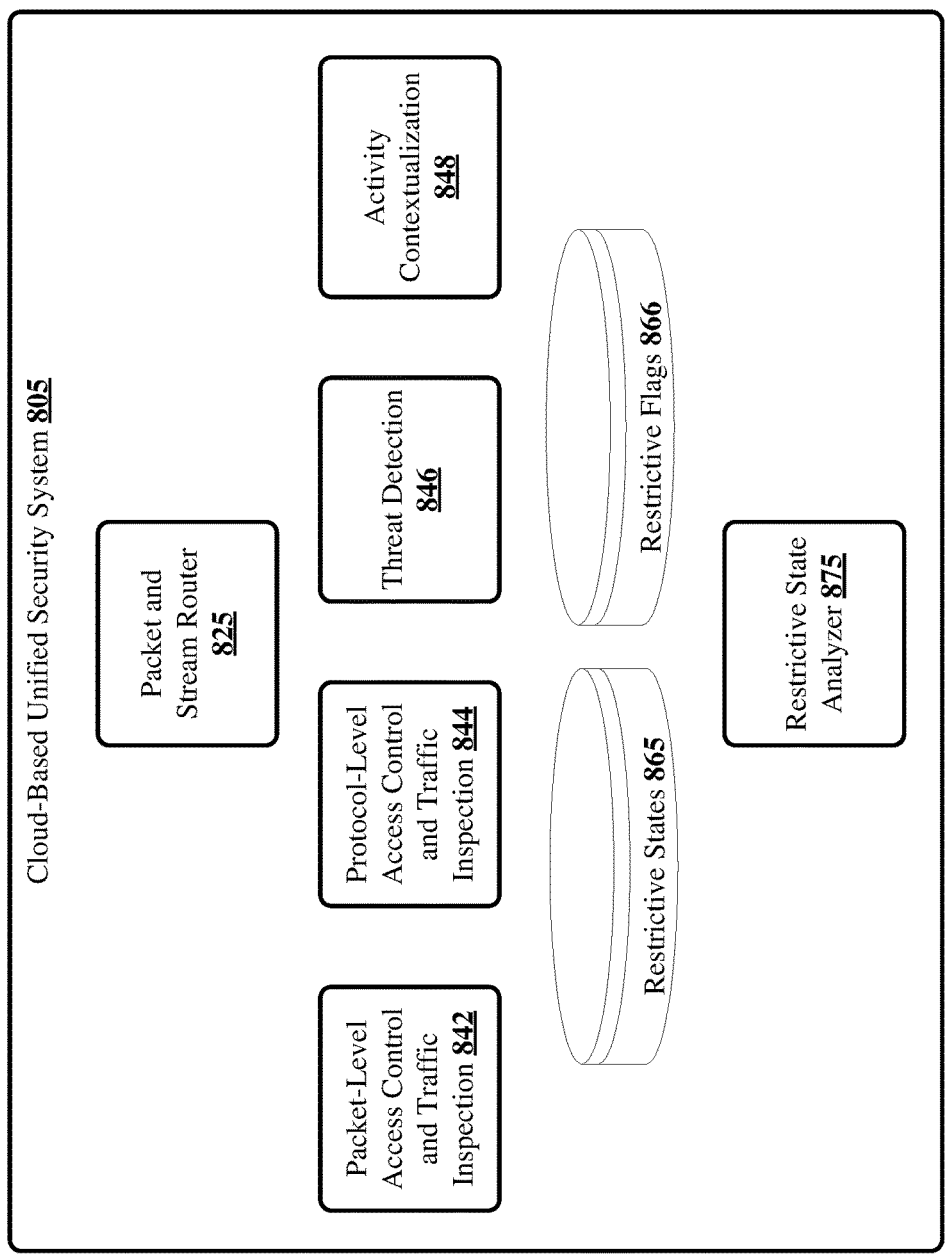
FIG. 8 is a block diagram that illustrates the disclosed unified policy enforcement system of cloud-based components for packet-level access control and traffic inspection, protocol-level access control and traffic inspection, threat detection and activity contextualization.

FIG. 8 is a block diagram that illustrates the disclosed unified policy enforcement system of cloud-based components for packet-level access control and traffic inspection, protocol-level access control and traffic inspection, threat detection and activity contextualization.

Cloud-based unified security system 805 can include a packet and stream router 825 configured to convey each incoming access request of packets through components that apply to that type of packet, at least until one of the components sets a restrictive state on at least one object corresponding to the incoming access request or until all of the components that apply have passed the incoming access request. System 805 has components for packet-level access control and traffic inspection 842, protocol-level access control and traffic inspection 844, threat detection 846 and activity contextualization 848.

Access control and traffic inspection components execute firewall functionality. Threat detection 846 is a secure web gateway (SWG) component that analyzes web operations to detect anomalies in the data and prevent access to unsanctioned and dangerous websites. Activity contextualization 848 is a Netskope cloud access security broker (N-CASB), as described relative to FIG. 1 earlier, a component that processes content-containing activity such as login, file transfer and sharing operations to control them and detect anomalies in the data, to classify the activity as compromising or not.

Continuing the description of the block diagram of FIG. 8, packet-level access control and traffic inspection 842 is configured to inspect packet headers in an or in a response to an access request, collectively the request or response, with or without any prior processing, and classify the request or response as inspectable or non-inspectable. Then, based on the classifying, packet-level access control and traffic inspection 842 is configured, when the packet headers are malformed, to set a first restrictive state. in addition to looking for malformed packets and non-inspectable packets, packet-level access control and traffic inspection 842 can also apply access control policy which will result in a restrictive state.

When the packet headers are well-formed but the request or response is non-inspectable, packet-level access control and traffic inspection 842 is configured to pass the request or response to a destination server, bypassing threat detection 846 and activity contextualization 848, and when packet headers are well-formed and the request or response is inspectable, to pass the request or response to protocol-level access control and traffic inspection 844. Protocol-level access control and traffic inspection 844 is configured to perform deep packet inspection on the request or response, with or without any prior processing.

When the packets hold one or more malicious signatures, protocol-level access control and traffic inspection 844 is configured to set a second restrictive state, and otherwise, to pass the request or response. Protocol-level access control and traffic inspection 844 can also apply access control policies at the application level in addition to looking for threat signatures and if an access control policy matches, the request can be put in a restrictive state. Threat detection 846 is configured, when the request or response is an HTTP/S stream, to classify the request or response as directed to a threat destination or not, then based on the classifying, and is configured, when the request or response is directed to a threat destination, to set a third restrictive state, and otherwise, to pass the request or response.

Occasionally, a less commonly applied time-based policy can be employed to prevent users to access YouTube 9 am-5 pm. Activity contextualization 848 is configured, when the request or response is an HTTP/S stream seeking access to a cloud-based application, to recognize and process content-containing activity, to classify the activity as compromising or not. Activity contextualization 848 is configured, when the request or response is compromising, to set a fourth restrictive state, and otherwise, to pass the request or response. Activity contextualization 848 with N-CASB can apply policies on both content containing activity and non-content containing activities.

In one example, a non-content activity is login or create/edit document. Restrictive states 865 stores the restrictive states for the cloud-based components. Restrictive state analyzer 875 determines whether the first, second, third or fourth restrictive state has been set, and based on setting of any of the states, takes restrictive steps in response to the request or response.

Further continuing the description of the cloud-based unified policy enforcement system of FIG. 8, packet and stream router 825 is configured to pass the incoming access stream through packet-level access control and traffic inspection component 842 before the protocol-level access control and traffic inspection 844, threat detection 846 and activity contextualization 848 components, in some implementations.

The packet-level access control and traffic inspection component 842 before the protocol-level access control and traffic inspection 844, threat detection 846 and activity contextualization 848 components are configured to pass a restrictive state message to a subsequent component or to restrictive state analyzer 875 as the incoming access stream processing proceeds, in some implementations.

The packet-level access control and traffic inspection component 842, protocol-level access control and traffic inspection 844, threat detection 846 and activity contextualization 848 components are configured to send a restrictive state message to restrictive states 865, a common state store, for processing by the restrictive state analyzer 875 as the incoming access stream processing proceeds, in other implementations. The components are configured to set a restrictive state flag in restrictive flags 866, a common flag store, for processing by restrictive state analyzer 875 as the incoming access stream processing proceeds.

In a different implementation, the packet-level access control and traffic inspection component 842, protocol-level access control and traffic inspection 844, threat detection 846 and activity contextualization 848 components are configured to save a restrictive state flag in restrictive flags 866 as the incoming access stream processing winds from a first component to a last component and then to invoke restrictive state analyzer 875 with the saved restrictive state flag to take restrictive steps as the incoming access stream processing unwinds from the last component to the first component.

Restrictive steps taken by restrictive state analyzer 875 include, but are not limited to blocking packets, alerting of restrictions, bypassing, encrypting, coaching a user relative to actions to choose and quarantining traffic.

Figure 9:
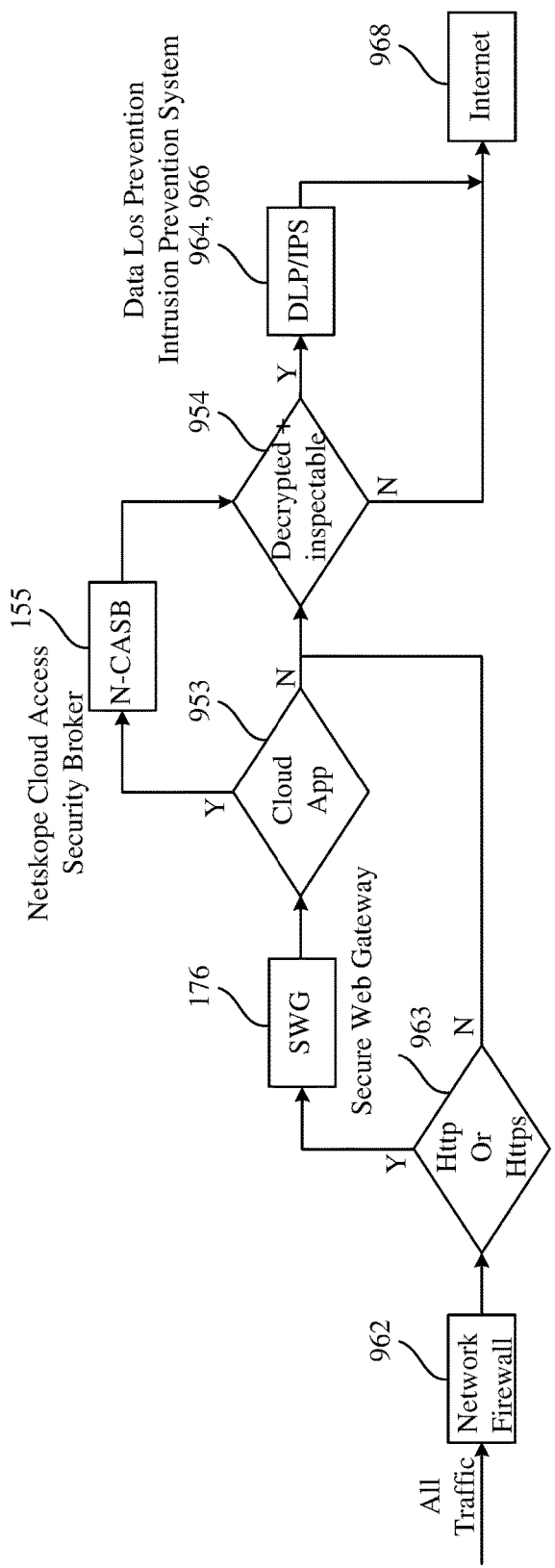
FIG. 9 illustrates an example logical traffic flow for the cloud-based policy enforcement system that unifies functions of access control and traffic inspection, threat detection and activity contextualization and performs data loss prevention analysis on inspectable and non-inspectable traffic, for one embodiment of the disclosed technology.

FIG. 9 illustrates an example logical traffic flow for the cloud-based policy enforcement system that unifies functions of access control and traffic inspection, threat detection and activity contextualization and performs data loss prevention analysis on inspectable and non-inspectable traffic, for one embodiment of the disclosed technology. In this example of packet flow, all traffic enters via network firewall 962, at an IP address which can be defined by an IP address, or hostname.

For another implementation, network firewall 962 could be defined by domain name. In yet another implementation, a combination of domain and IP addressing could be utilized for accessing network firewall 962. Firewall 962 does deep packet inspection, including checking for correct origin and well-formed packets, as malformed packets could be designed to crash the firewall, in one example.

Even for HTTP/S traffic, network firewall 962 continues to inspect subsequent packets to detect malformed traffic as packets go to SWG 176 and N-CASB 155, and could recognize activity—including upload, download, preview, etc., for traffic along with inspection of the routing protocol in some implementations. Firewall 962, SWG 176 and N-CASB 155 can apply their respective policies in parallel and can allow, block, alert and apply other actions when they determine which policy to apply.

Continuing the description of logical traffic flow, firewall 962 analyzes traffic 963 and routes web traffic, utilizing Hypertext Transfer Protocol (http) and Hypertext Transfer Protocol Secure (https) to secure web gateway (SWG) 176. Non-http/https traffic gets routed separately, to be filtered to determine whether it is decrypted and inspectable 954.

One example of non-web traffic utilizes TCP 54000, for port 54000, which is not an HTTP/S port. SWG 176 identifies acceptable categories of white/blacklist of destinations for web browsing, with granular policy controls for managing web traffic that can include threat protection, URL filtering, and DLP policies.

Cloud apps are specified by web domain, with traffic analyzed to determine packets for a cloud app 953, such as software as a service (SaaS). Identified packets are routed to Netskope cloud access security broker (N-CASB) 155, which securely processes traffic over streaming protocols and web traffic over other protocols, in addition to governing access and activities in sanctioned and unsanctioned cloud apps, securing sensitive data and preventing its loss, and protecting against internal and external threats as described earlier. N-CASB 155 identifies users and allows traffic for them and shares the user information with firewall 962 so that firewall 962 can allow those users to access non-HTTP/S services also.

After inspection at N-CASB 155, traffic gets filtered to determine whether it is decrypted and inspectable 954, and if the traffic is decrypted and inspectable, the packets are routed for data loss prevention (DLP) 964 and intrusion prevention system (IPS) 966 inspection. DLP/IPS is done asynchronously and when issues are detected, firewall 962, SWG 176 and N-CASB 155 take action based on the restrictive states and restrictive flags, and the configured enabled policies. Packets that are deemed safe are allowed to pass through to the Internet 968. Other actions, including blocking, alerting bypassing, quarantining and coaching are described earlier.

Workflows are described next for unified policy management in the cloud, as well as for dynamic distribution of unified policies in a cloud-based policy enforcement system. with a policy manager that unifies functions of packet-based and protocol-based access control and traffic inspection, threat detection and activity contextualization on inspectable and non-inspectable traffic. The disclosed policy enforcement services platform scales horizontally and uniformly to administer customized security services and policies for organizations and avoid single points of failure.

Workflows are also described for the disclosed dynamic routing of access request streams and a unified system for detecting security issues in a cloud-based environment.

Workflows

Figure 10:
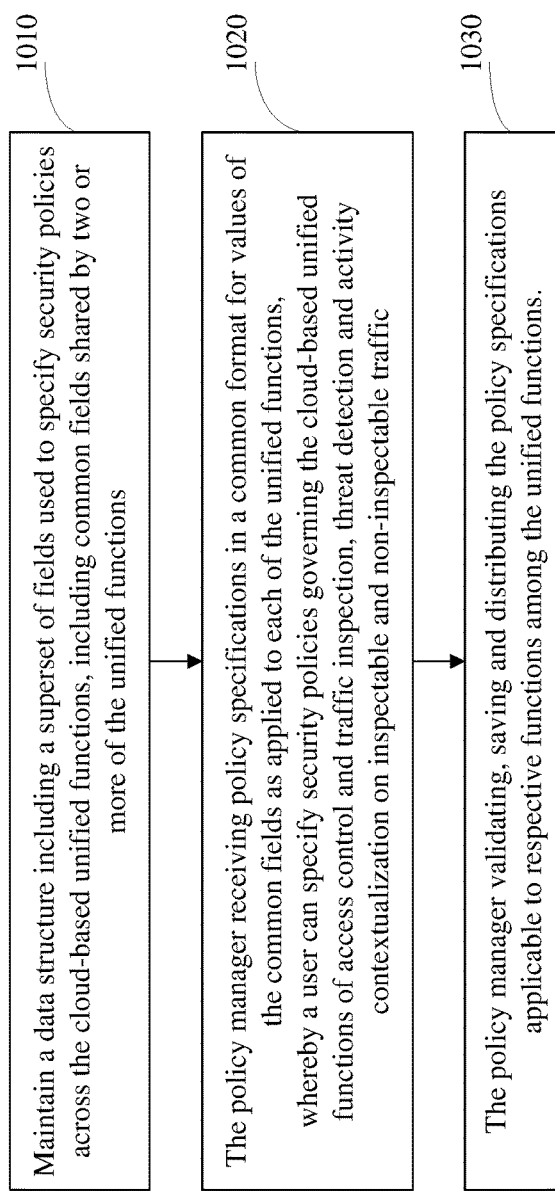
FIG. 10 shows a representative computer-implemented method of unified security policy management in the cloud, applied by a policy manager to a cloud-based policy enforcement system that unifies functions of packet-level and protocol-level access control and traffic inspection, threat detection and activity contextualization on inspectable and non-inspectable traffic.

FIG. 10 shows a representative computer-implemented method of unified security policy management in the cloud, applied by a policy manager to a cloud-based security system that unifies functions of packet-level and protocol-level access control and traffic inspection, threat detection and activity contextualization on inspectable and non-inspectable traffic. Flowchart 1000 can be implemented at least partially with a computer or other data processing system; that is, by one or more processors configured to receive or retrieve information, process the information, store results, and transmit the results.

Other implementations may perform the actions in different orders and/or with different, fewer or additional actions than those illustrated in FIG. 10. Multiple actions can be combined in some implementations. For convenience, this flowchart is described with reference to a system which includes unified cloud-based security system 805, described earlier.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features.

FIG. 10 begins with action 1010 for maintaining a data structure including a superset of fields used to specify security policies across the cloud-based unified functions, including common fields shared by two or more of the unified functions.

Process 1000 continues at action 1020, with the policy manager receiving policy specifications in a common format for values of the common fields as applied to each of the unified functions, whereby a user can specify security policies governing the cloud-based unified functions of access control and traffic inspection, threat detection and activity contextualization on inspectable and non-inspectable traffic.

Action 1030 includes the policy manager validating, saving and distributing the policy specifications applicable to respective functions among the unified functions.

Other implementations may perform the actions in different orders and/or with different, fewer or additional actions than those illustrated in FIG. 10. Multiple actions can be combined in some implementations. For convenience, this flowchart is described with reference to the system that carries out a method. The system is not necessarily part of the method.

Figure 11:
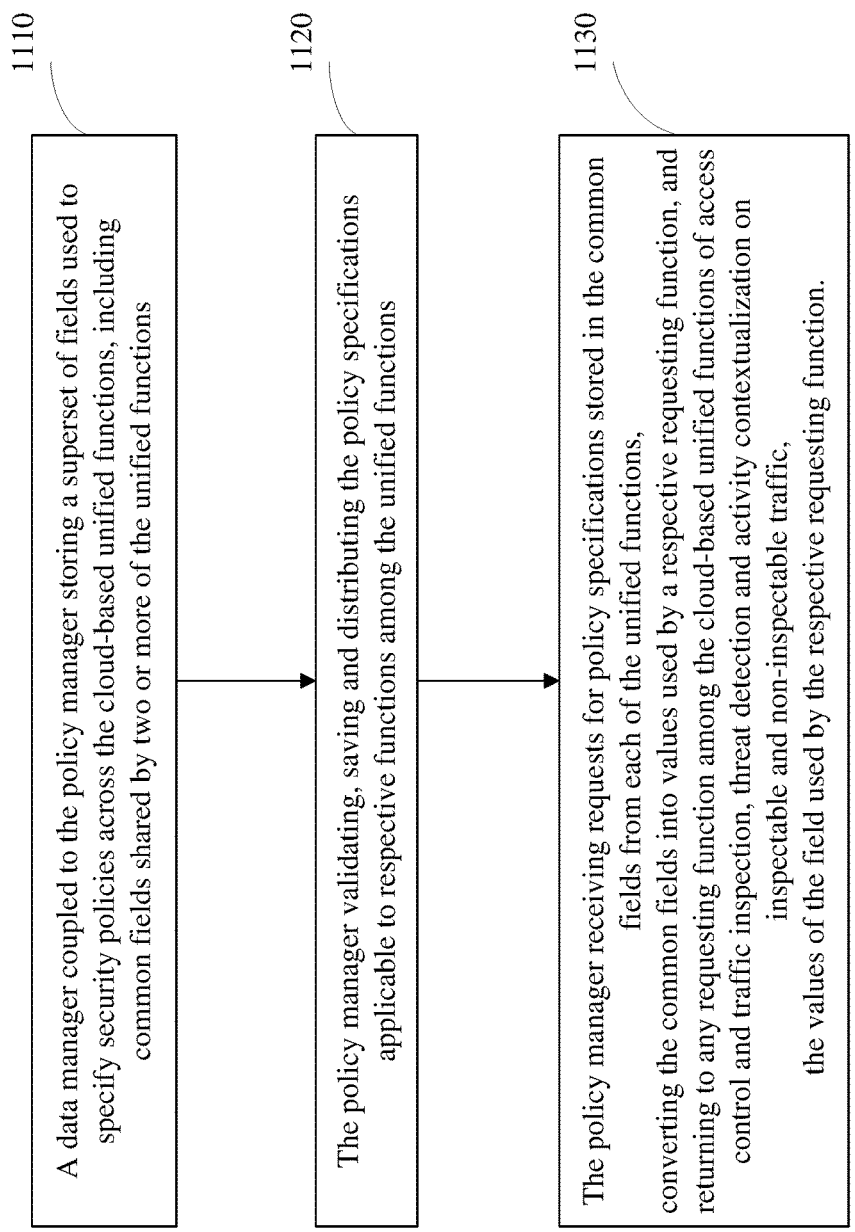
FIG. 11 shows a representative method for dynamic distribution of unified enforcement policies in a cloud-based policy enforcement system, as applied by a policy manager to a cloud-based policy enforcement system that unifies functions of access control and traffic inspection, threat detection and activity contextualization on inspectable and non-inspectable traffic.

FIG. 11 shows a representative method for dynamic distribution of unified security policies in a cloud-based security system, as applied by a policy manager to a cloud-based security system that unifies functions of access control and traffic inspection, threat detection and activity contextualization on inspectable and non-inspectable traffic. Flowchart 1100 can be implemented at least partially with a computer or other data processing system; that is, by one or more processors configured to receive or retrieve information, process the information, store results, and transmit the results.

Other implementations may perform the actions in different orders and/or with different, fewer or additional actions than those illustrated in FIG. 11. Multiple actions can be combined in some implementations. For convenience, this flowchart is described with reference to a system which includes unified cloud-based security system 805, described earlier.

FIG. 11 begins with action 1110 with a data manager coupled to the policy manager storing a superset of fields used to specify security policies across the cloud-based unified functions, including common fields shared by two or more of the unified functions.

Process 1100 continues at action 1120, with the policy manager validating, saving and distributing the policy specifications applicable to respective functions among the unified functions.

Action 1130 is the policy manager receiving requests for policy specifications stored in the common fields from each of the unified functions, converting the common fields into values used by a respective requesting function, and returning to any requesting function among the cloud-based unified functions of access control and traffic inspection, threat detection and activity contextualization on inspectable and non-inspectable traffic, the values of the field used by the respective requesting function Other implementations may perform the actions in different orders and/or with different, fewer or additional actions than those illustrated in FIG. 11. Multiple actions can be combined in some implementations.

Figure 12:
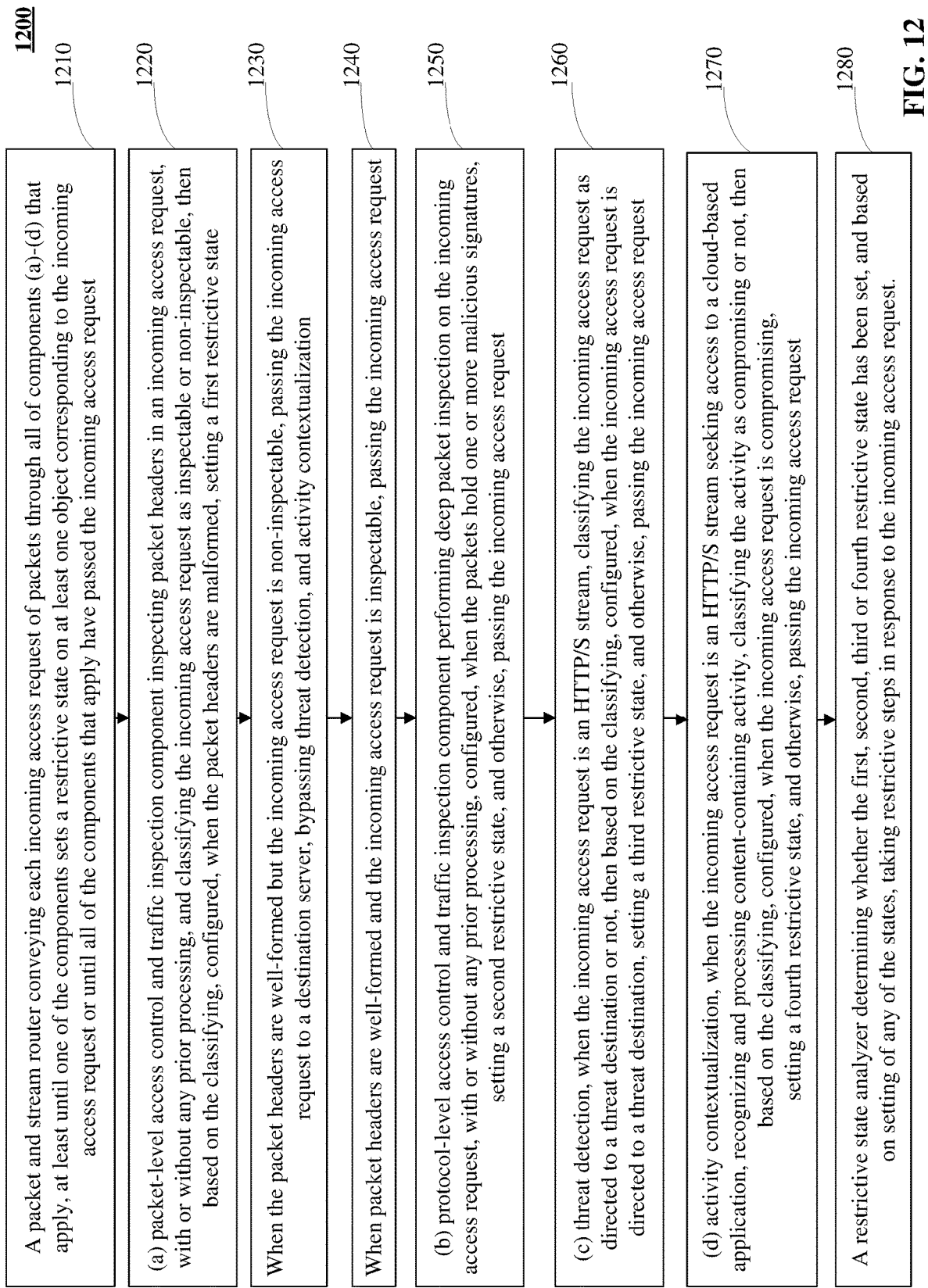
FIG. 12 shows a representative method of processing incoming access requests of packets through cloud-based components that perform (a) packet-level access control and traffic inspection, (b) protocol-level access control and traffic inspection, (c) threat detection, and (d) activity contextualization.

FIG. 12 shows a representative method of processing incoming access requests of packets through cloud-based components that perform (a) packet-level access control and traffic inspection, (b) protocol-level access control and traffic inspection, (c) threat detection, and (d) activity contextualization. Flowchart 1200 can be implemented at least partially with a computer or other data processing system; that is, by one or more processors configured to receive or retrieve information, process the information, store results, and transmit the results.

Other implementations may perform the actions in different orders and/or with different, fewer or additional actions than those illustrated in FIG. 12. Multiple actions can be combined in some implementations. For convenience, this flowchart is described with reference to a system which includes unified cloud-based security system 805, described earlier.

FIG. 12 begins with action 1210 with a packet and stream router conveying each incoming access request of packets through all of components (a)-(d) that apply, at least until one of the components sets a restrictive state on at least one object corresponding to the incoming access request or until all of the components that apply have passed the incoming access request.

Process 1200 continues at action 1220, with (a) the packet-level access control and traffic inspection component inspecting packet headers in an incoming access request, with or without any prior processing, and classifying the incoming access request as inspectable or non-inspectable, then based on the classifying, configured, when the packet headers are malformed, setting a first restrictive state.

Action 1230, when the packet headers are well-formed but the incoming access request is non-inspectable, includes passing the incoming access request to a destination server, bypassing threat detection and activity contextualization.

Process 1200 continues at action 1240, when packet headers are well-formed and the incoming access request is inspectable, passing the incoming access request.

Process 1200 further continues at action 1250, with (b) the protocol-level access control and traffic inspection component performing deep packet inspection on the incoming access request, with or without any prior processing, configured, when the packets hold one or more malicious signatures, setting a second restrictive state, and otherwise, passing the incoming access request.

Process 1200 continues at action 1260, with (c) threat detection, when the incoming access request is an HTTP/S stream, classifying the incoming access request as directed to a threat destination or not, then based on the classifying, configured, when the incoming access request is directed to a threat destination, setting a third restrictive state, and otherwise, passing the incoming access request.

Process 1200 further continues at action 1270, with (d) activity contextualization, when the incoming access request is an HTTP/S stream seeking access to a cloud-based application, recognizing and processing content-containing activity, classifying the activity as compromising or not, then based on the classifying, configured, when the incoming access request is compromising, setting a fourth restrictive state, and otherwise, passing the incoming access request.

Process 1200 completes at action 1280, with a restrictive state analyzer determining whether the first, second, third or fourth restrictive state has been set, and based on setting of any of the states, taking restrictive steps in response to the incoming access request.

Other implementations may perform the actions in different orders and/or with different, fewer or additional actions than those illustrated in FIG. 12. Multiple actions can be combined in some implementations.

Figure 13:
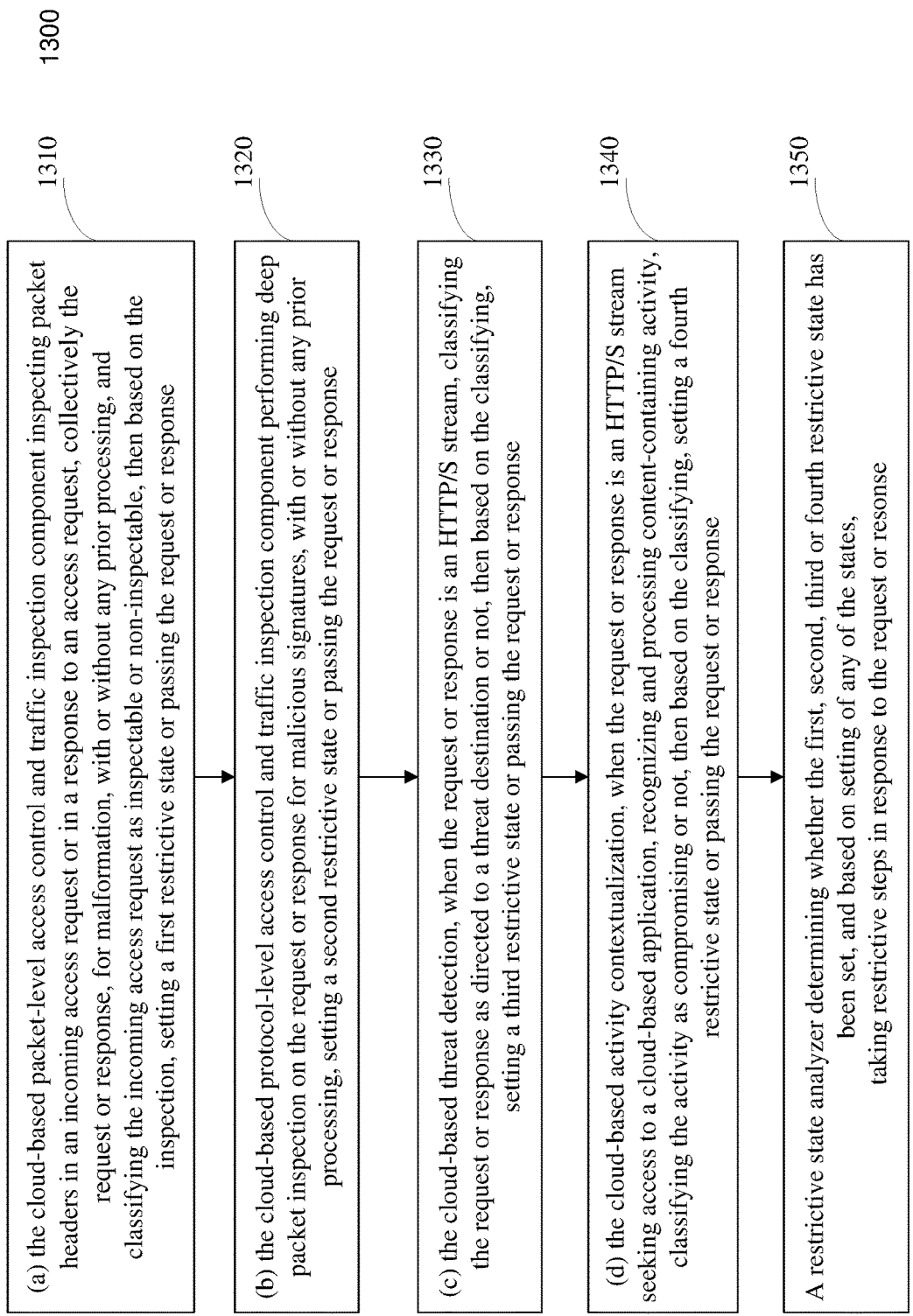
FIG. 13 shows a representative method of dynamically routing access request streams through cloud-based components for (a) packet-level access control and traffic inspection, (b) protocol-level access control and traffic inspection, (c) threat detection, and (d) activity contextualization.

FIG. 13 shows a representative method of dynamically routing access request streams through cloud-based components for (a) packet-level access control and traffic inspection, (b) protocol-level access control and traffic inspection, (c) threat detection, and (d) activity contextualization. Flowchart 1300 can be implemented at least partially with a computer or other data processing system; that is, by one or more processors configured to receive or retrieve information, process the information, store results, and transmit the results.

Other implementations may perform the actions in different orders and/or with different, fewer or additional actions than those illustrated in FIG. 13. Multiple actions can be combined in some implementations. For convenience, this flowchart is described with reference to a system which includes unified cloud-based security system 805, described earlier.

FIG. 13 begins at action 1310 with (a) the cloud-based packet-level access control and traffic inspection component inspecting packet headers in an incoming access request or in response to an access request, collectively the request or response, for malformation, with or without any prior processing, and classifying the request or response as inspectable or non-inspectable, then based on the inspection, setting a first restrictive state or passing the request or response.

Process 1300 continues at action 1320, with the cloud-based protocol-level access control and traffic inspection component performing deep packet inspection on the request or response for malicious signatures, with or without any prior processing, setting a second restrictive state or passing the request or response.

Process 1300 continues at action 1330, with cloud-based threat detection, when the request or response is an HTTP/S stream, classifying the request or response as directed to a threat destination or not, then based on the classifying, setting a third restrictive state or passing the request or response.

Action 1340 includes cloud-based activity contextualization, when the request or response is an HTTP/S stream seeking access to a cloud-based application, recognizing and processing content-containing activity, classifying the activity as compromising or not, then based on the classifying, setting a fourth restrictive state or passing the request or response.

Process 1300 completes with action 1350, with a restrictive state analyzer determining whether the first, second, third or fourth restrictive state has been set, and based on setting of any of the states, taking restrictive steps in response to the request or response.

Other implementations may perform the actions in different orders and/or with different, fewer or additional actions than those illustrated in FIG. 13. Multiple actions can be combined in some implementations.

Computer System

Figure 14:
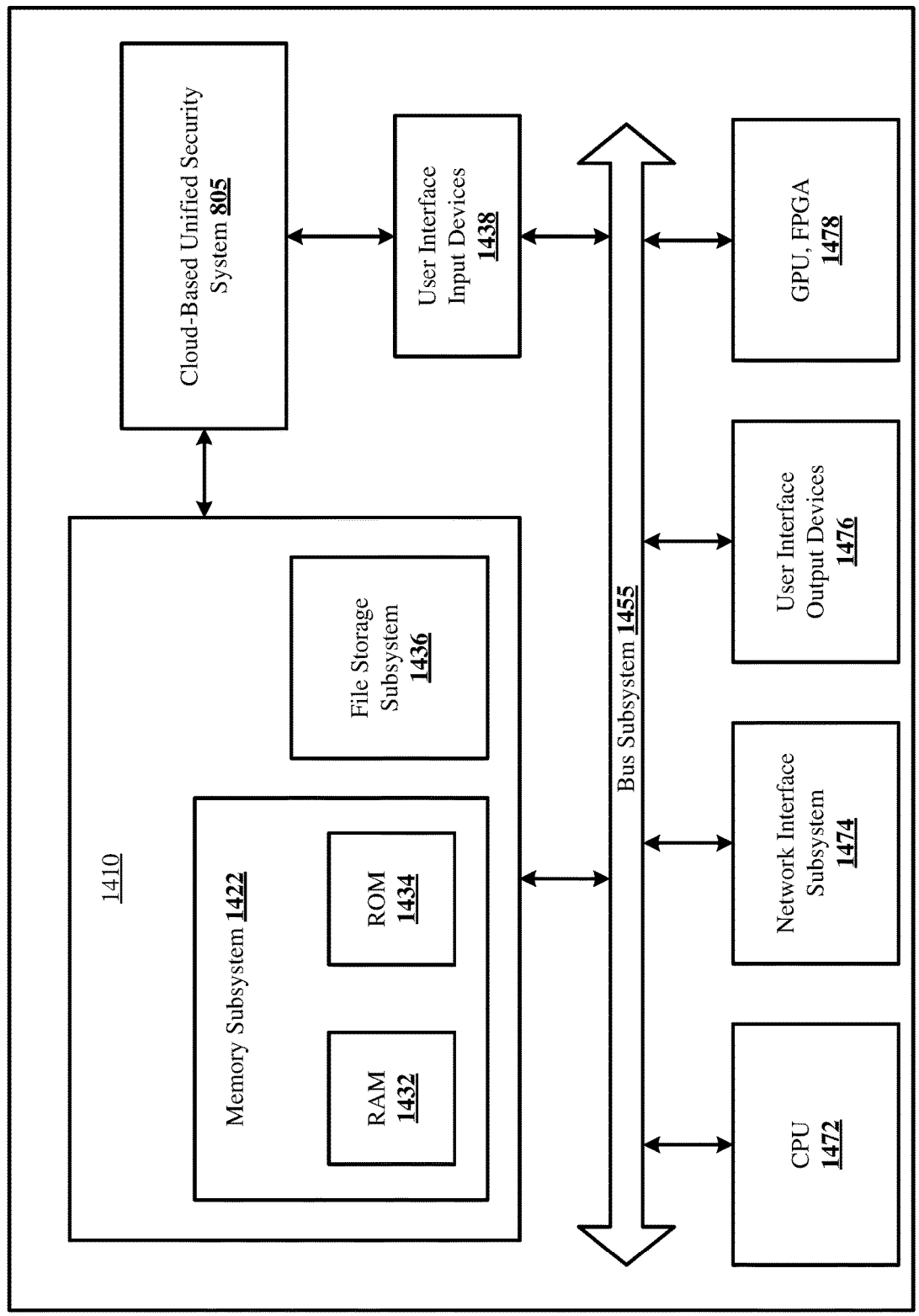
FIG. 14 is a simplified block diagram of a computer system that can be used to implement the disclosed unified policy enforcement system of cloud-based components for packet-level access control and traffic inspection, protocol-level access control and traffic inspection, threat detection and activity contextualization.

FIG. 14 is a simplified block diagram of a computer system 1400 that can be used to implement a policy manager device for a cloud-based security system that unifies functions of packet-level and protocol-level access control and traffic inspection, threat detection and activity contextualization on inspectable and non-inspectable traffic. Computer system 1400 is also usable to implement dynamic distribution of unified security policies in a cloud-based security system, dynamically route access request streams in a unified security system, and detect security issues in a cloud-based environment.

Computer system 1400 includes at least one central processing unit (CPU) 1472 that communicates with a number of peripheral devices via bus subsystem 1455, and cloud-based unified security system 805 for providing network security services described herein. These peripheral devices can include a storage subsystem 1410 including, for example, memory devices and a file storage subsystem 1436, user interface input devices 1438, user interface output devices 1476, and a network interface subsystem 1474. The input and output devices allow user interaction with computer system 1400. Network interface subsystem 1474 provides an interface to outside networks, including an interface to corresponding interface devices in other computer systems.

In one embodiment, cloud-based unified security system 805 of FIG. 1 is communicably linked to the storage subsystem 1410 and the user interface input devices 1438.

User interface input devices 1438 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1400.

User interface output devices 1476 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1400 to the user or to another machine or computer system.

Storage subsystem 1410 stores programming and data constructs that provide the functionality of some or all of the modules and methods described herein. Subsystem 1478 can be graphics processing units (GPUs) or field-programmable gate arrays (FPGAs).

Memory subsystem 1422 used in the storage subsystem 1410 can include a number of memories including a main random access memory (RAM) 1432 for storage of instructions and data during program execution and a read only memory (ROM) 1434 in which fixed instructions are stored. A file storage subsystem 1436 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1436 in the storage subsystem 1410, or in other machines accessible by the processor.

Bus subsystem 1455 provides a mechanism for letting the various components and subsystems of computer system 1400 communicate with each other as intended. Although bus subsystem 1455 is shown schematically as a single bus, alternative implementations of the bus subsystem can use multiple busses.

Computer system 1400 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 1400 depicted in FIG. 14 is intended only as a specific example for purposes of illustrating the preferred embodiments of the present invention. Many other configurations of computer system 1400 are possible having more or less components than the computer system depicted in FIG. 14.

Particular Implementations

Some particular implementations and features for a cloud-based security system that unifies functions of packet-level and protocol-level access control and traffic inspection, threat detection and activity contextualization and content inspection on inspectable and non-inspectable traffic are described in the following discussion.

In one disclosed implementation, a computer-implemented policy manager device for a cloud-based security system that unifies functions of packet-level and protocol-level access control and traffic inspection, threat detection and activity contextualization and content inspection on inspectable and non-inspectable traffic on inspectable and non-inspectable traffic, includes a data manager for a superset of fields used to specify security policies across the cloud-based unified functions, including common fields shared by two or more of the unified functions.

The disclosed device also includes a means for receiving policy specifications in a common format for values of the common fields as applied to each of the unified functions, whereby a user interacting with the means for receiving can specify security policies governing the cloud-based unified functions of access control and traffic inspection, threat detection and activity contextualization and inspection on inspectable and non-inspectable traffic, and a policy manager configured to validate, save and distribute the policy specifications applicable to respective functions among the unified functions.

The device described in this section and other sections of the technology disclosed can include one or more of the following features and/or features described in connection with additional features disclosed. In the interest of conciseness, the combinations of features disclosed in this application are not individually enumerated and are not repeated with each base set of features. The reader will understand how features identified in this method can readily be combined with sets of base features identified as implementations.

In some implementations of the disclosed policy manager device, structures used to implement the device alternatively and more broadly may include common fields shared by two or more of the unified functions and can include source of traffic to be inspected, destination of the traffic, protocol used by the traffic, category of the traffic, activity specified in inspectable traffic, profile for a particular function and action to be triggered in case of exception resulting from inspection.

The values for the common fields include, for a source or destination of traffic to be inspected: an IP address or range, or a port number. Additional values for a source or destination of traffic to be inspected can include destination hostnames, destination domain names, source user, source organizational group and source country. For a protocol used by the traffic, values for the common fields include HTTP/S, TCP, UDP, or ICMP. Values for the common fields for an activity specified in inspectable traffic include upload, download, preview or share.

For profile for a particular function, values for the common fields include one or more of the access control and traffic inspection, the threat detection and the activity contextualization and inspection. Common field values for an action to be triggered in case of exception resulting from inspection include allow, block, alert, bypass, encrypt, coach or quarantine. For category of the traffic for a particular function, values for the common fields include one or more of business, finance, storage, collaboration and email in one embodiment. The policy can also include user specific rules.

In one implementation of the disclosed policy manager device, the means for receiving includes a GUI generator configured to generate a graphical user interface (GUI) that presents the common fields in a consistent order with consistent value completion options across the unified functions, contextualized to required fields for specification of policies used by particular functions.

In this case, the GUI generator can cause delivery of the GUI to a user, and receive from the user selections from the GUI that specify a policy applicable to one or more of the unified functions. In one implementation of the disclosed policy manager device, structures used to implement the device alternatively and more broadly may include a GUI generator configured to generate a graphical user interface (GUI) that presents the common fields in a consistent order with consistent value completion options across the unified functions, contextualized to required fields for specification of policies used by particular functions.

In another implementation of the disclosed policy manager device, the means for receiving includes an application program interface (API) configured to receive a data structure in which required fields used by particular functions are contextualized to each of the unified functions with consistent key tags and consistent value completion options across the unified functions.

In some cases, the data structure is organized in key-value pairs. In one implementation of the disclosed policy manager device, structures used to implement the device alternatively and more broadly may include an application program interface (API) configured to receive a data structure in which required fields used by particular functions are contextualized to each of the unified functions with consistent key tags and consistent value completion options across the unified functions.

In other implementations of the disclosed policy manager device, the means for receiving includes a data structure parser configured to receive a data structure in which required fields used by particular functions are contextualized to each of the unified functions with consistent field names and consistent field value options across the unified functions.

In one implementation of the disclosed policy manager device, structures used to implement the device alternatively and more broadly may include a data structure parser configured to receive a data structure in which required fields used by particular functions are contextualized to each of the unified functions with consistent field names and consistent field value options across the unified functions.

In yet another implementation of the disclosed policy manager device, the means for receiving includes a command line interface (CLI) configured to accept and parse policy configuration commands used to populate a data structure of key-value pairs in which required fields used by particular functions are contextualized to each of the unified functions with consistent key tags and consistent value completion options across the unified functions.

In one implementation of the disclosed policy manager device, structures used to implement the device alternatively and more broadly may include a command line interface (CLI) configured to accept and parse policy configuration commands used to populate a data structure of key-value pairs in which required fields used by particular functions are contextualized to each of the unified functions with consistent key tags and consistent value completion options across the unified functions.

For some implementations of the disclosed policy manager device described earlier, (a) the packet-level access control and traffic inspection component (network firewall) is configured to inspect packet headers in an incoming access request or in a response to an access request, collectively the request or response, for malformation, with or without any prior processing, and classify the request or response as inspectable or non-inspectable, then based on the inspection, to set a first restrictive state or pass the request or response.

The (b) protocol-level access control and traffic inspection component (such as an application firewall), is configured to perform deep packet inspection on the request or response for malicious signatures, with or without any prior processing, configured to set a second restrictive state or pass the request or response. The protocol-level access control and traffic inspection component can also perform application identification and recognition as a connection level inspection, for example, when the app ID signature crosses a packet boundary, analyzing application protocols and streams of data to detect protocol anomalies for HTTP/S and other network protocols, such as SMB, FTP, SMTP and DNS.

The (c) threat detection (secure web gateway and/or application firewall) is configured, when the request or response is an HTTP/S stream, to classify the request or response as directed to a threat destination or not, then based on the classifying, configured to set a third restrictive state or pass the request or response.

The (d) activity contextualization (for example, Netskope Cloud Access Security Broker) is configured, when the request or response is an HTTP/S stream seeking access to a cloud-based application, to recognize and process content-containing activity, to classify the activity as compromising or not, then based on the classifying, configured to set a fourth restrictive state or pass the request or response.

One implementation of a disclosed computer-implemented method applied by a policy manager to a cloud-based security system that unifies functions of packet-level and protocol-level access control and traffic inspection, threat detection and activity contextualization and content inspection on inspectable and non-inspectable traffic includes maintaining a data structure including a superset of fields used to specify security policies across the cloud-based unified functions, including common fields shared by two or more of the unified functions.

The disclosed method also includes the policy manager receiving policy specifications in a common format for values of the common fields as applied to each of the unified functions, whereby a user can specify security policies governing the cloud-based unified functions of access control and traffic inspection, threat detection and activity contextualization and inspection on inspectable and non-inspectable traffic. Further, the method includes the policy manager validating, saving and distributing the policy specifications applicable to respective functions among the unified functions.

An implementation of a computer-implemented method applied by a policy manager to a cloud-based security system that unifies functions of access control and traffic inspection, threat detection and activity contextualization and inspection on inspectable and non-inspectable traffic includes a data manager coupled to the policy manager storing a superset of fields used to specify security policies across the cloud-based unified functions, including common fields shared by two or more of the unified functions.

The method includes the policy manager validating, saving and distributing the policy specifications applicable to respective functions among the unified functions. The method also includes the policy manager receiving requests for policy specifications stored in the common fields from each of the unified functions, converting the common fields into values used by a respective requesting function, and returning to any requesting function among the cloud-based unified functions of access control and traffic inspection, threat detection and activity contextualization on inspectable and non-inspectable traffic, the values of the field used by the respective requesting function.

For some implementations of the disclosed computer-implemented method, the common fields shared by two or more of the unified functions include: source of traffic to be inspected, destination of the traffic, protocol used by the traffic, activity specified in inspectable traffic, profile for a particular function and action to be triggered in case of exception resulting from inspection.

The values for the common fields include for a source or destination of traffic to be inspected: an IP address or range, or a port number; for a protocol used by the traffic: HTTP, TCP, UDP, or ICMP; for an activity specified in inspectable traffic: upload, download, preview or share; for profile for a particular function: one or more of the access control and traffic inspection, the threat detection and the activity contextualization and inspection; and for an action to be triggered in case of exception resulting from inspection: allow, block, require additional authentication, alert, bypass, encrypt, coach or quarantine.

One implementation of the computer-implemented method further includes a browser-based or client-based GUI generator generating a graphical user interface (GUI) that presents the common fields in a consistent order for consistent value reporting across the unified functions, contextualized to required fields for specification of policies used by particular functions. The method also includes the GUI receiving from the user a query and identification of at least one of the unified functions for which a specification of one or more policies responsive to the query is to be returned, and populating and causing delivery of the GUI to a user with the specification of the policies responsive to the query. The disclosed can include a fat client or thin client-based GUI generator.

Another implementation of the computer-implemented method includes an application program interface receiving a query and identification of at least one of the unified functions for which a specification of one or more policies responsive to the query is to be returned, and populating and causing delivery of a data structure of key-value pairs for one or more policies responsive to the query.

Yet another implementation of the computer-implemented method includes a data structure parser receiving a data structure including a query and identification of at least one of the unified functions for which a specification of one or more policies responsive to the query is to be returned, and populating and causing delivery of a data structure of key-value pairs for one or more policies responsive to the query. Some implementations of the computer-implemented method further includes a command line interface (CLI) accepting and parsing a query and identification of at least one of the unified functions for which a specification of one or more policies responsive to the query is to be returned.

The method also includes the CLI accepting the parsed query and specification, querying against a data structure of key-value pairs in which required fields used by particular functions are contextualized to each of the unified functions with consistent key tags and consistent value completion options across the unified functions, and returning results of the query.

For another implementation of the computer-implemented method, (a) the cloud-based packet-level access control and traffic inspection component is configured to inspect packet headers in an incoming access request for malformation, with or without any prior processing, and classify the incoming access request as potentially inspectable or non-inspectable, then based on the inspection, to set a first restrictive state or pass the incoming access request.

For the disclosed method, (b) the cloud-based protocol-level access control and traffic inspection component is configured to perform deep packet inspection on the incoming access request for malicious signatures, with or without any prior processing, configured to set a second restrictive state or pass the incoming access request.

Also, (c) the cloud-based threat detection is configured, when the incoming access request is an HTTP/S stream, to classify the incoming access request as directed to a threat destination or not, then based on the classifying, configured to set a third restrictive state or pass the incoming access request.

Further; (d) the cloud-based activity contextualization and inspection is configured, when the incoming access request is an HTTP/S stream seeking access to a cloud-based application, to recognize and process content-containing activity, to classify the activity as compromising or not, then based on the classifying, configured to set a fourth restrictive state or pass the incoming access request.

In some implementations of the disclosed method, an egress firewall function can apply egress policies after threat detection and cloud-based activity contextualization functionality is completed. In some cases, there can be a need to filter on the destination IP or perform a network address translation (NAT) function on the source IP address, remapping the IP address space into another by modifying network address information in the IP header of packets while they are in transit across the routing device.

One implementation of a disclosed method of processing incoming access requests of packets through cloud-based components that perform (a) packet-level access control and traffic inspection, (b) protocol-level access control and traffic inspection, (c) threat detection and (d) activity contextualization and inspection includes a packet and stream router conveying each incoming access request of packets through all of components (a)-(d) that apply, at least until one of the components sets a restrictive state on at least one object corresponding to the incoming access request or until all of the components that apply have passed the incoming access request.

The method also includes (a) the packet-level access control and traffic inspection component inspecting packet headers in an incoming access request, with or without any prior processing, and classifying the incoming access request as inspectable or non-inspectable, then based on the classifying, configured, when the packet headers are malformed, setting a first restrictive state; when the packet headers are well-formed but the incoming access request is non-inspectable, passing the incoming access request to a destination server, bypassing the threat detection, and the activity contextualization and inspection, and when packet headers are well-formed and the incoming access request is inspectable, passing the incoming access request.

The disclosed method further includes (b) the protocol-level access control and traffic inspection component performing deep packet inspection on the incoming access request, with or without any prior processing, configured, when the packets hold one or more malicious signatures, setting a second restrictive state, otherwise, passing the incoming access request.

The method also further includes (c) the threat detection, when the incoming access request is an HTTP/S stream, classifying the incoming access request as directed to a threat destination or not, then based on the classifying, configured, when the incoming access request is directed to a threat destination, setting a third restrictive state, and otherwise, passing the incoming access request.

Additionally included is (d) the activity contextualization and inspection, when the incoming access request is an HTTP/S stream seeking access to a cloud-based application, recognizing and processing content-containing activity, classifying the activity as compromising or not, then based on the classifying, configured, when the incoming access request is compromising, setting a fourth restrictive state, and otherwise, passing the incoming access request.

Yet further, the disclosed method includes a restrictive state analyzer determining whether the first, second, third or fourth restrictive state has been set, and based on setting of any of the states, taking restrictive steps in response to the incoming access request.

In another embodiment, a non-inspectable determination can be completed using a different component than the order described earlier. As an incoming access request passes through each of the (a)-(d) services, the prior service can also add contextual state for the next service to use, as an aid in the processing at the next component. In one example, the packet-level access control and traffic inspection service can set the user's IP address that can be used elsewhere. The protocol-level access control and traffic inspection component can set the application name that was detected using its signatures that can be used in N-CASB 155.

For some implementations of the method, the packet and stream router is configured to pass the incoming access stream through (a) the packet-level access control and traffic inspection component before the components (b)-(d).

In some implementations, the components (a)-(d) are configured to pass a restrictive state message to a subsequent component or to the restrictive state analyzer as the incoming access stream processing proceeds.

In other implementations, the components (a)-(d) are configured to send a restrictive state message to a common state store for processing by the restrictive state analyzer as the incoming access stream processing proceeds.

In yet other implementations, the components (a)-(d) are configured to set a restrictive state flag in a common flag store for processing by the restrictive state analyzer as the incoming access stream processing proceeds. In still other implementations, the components (a)-(d) are configured to save a restrictive state flag as the incoming access stream processing winds from a first component to a last component and then to invoke the restrictive state analyzer with the saved restrictive state flag to take restrictive steps as the incoming access stream processing unwinds from the last component to the first component. Multiple configurations described herein can be present in a single implementation.

For some implementations of the disclosed method, the restrictive steps taken by the restrictive analyzer include block, alert, require further authentication, bypass, encrypt, coach or quarantine.

In one implementation, a disclosed method of dynamically routing access request streams through cloud-based components for (a) packet-level access control and traffic inspection, (b) protocol-level access control and traffic inspection, (c) threat detection, and (d) activity contextualization and content inspection includes (a) the cloud-based packet-level access control and traffic inspection component inspecting packet headers in an incoming access request or in a response to an access request, collectively the request or response, for malformation, with or without any prior processing, and classifying the request or response as potentially inspectable or non-inspectable, then based on the inspection, setting a first restrictive state or passing the request or response.

The method also includes (b) the cloud-based protocol-level access control and traffic inspection component performing deep packet inspection on the request or response for malicious signatures, with or without any prior processing, setting a second restrictive state or passing the request or response. The cloud-based protocol-level access control and traffic inspection component can also perform deep packet inspection on the request or response for application identification and/or recognition.

The disclosed method further includes (c) the cloud-based threat detection, when the request or response is an HTTP/S stream, classifying the request or response as directed to a threat destination or not, then based on the classifying, setting a third restrictive state or passing the request or response.

Additionally, the disclosed method includes (d) the cloud-based activity contextualization and inspection, when the request or response is an HTTP/S stream seeking access to a cloud-based application, recognizing and processing content-containing activity, classifying the activity as compromising or not, then based on the classifying, setting a fourth restrictive state or passing the request or response.

The disclosed method further includes a restrictive state analyzer determining whether the first, second, third or fourth restrictive state has been set, and based on setting of any of the states, taking restrictive steps in response to the request or response. For some implementations, the method also includes passing the incoming access stream through (a) the cloud-based packet-level access control and traffic inspection component before the components (b)-(d).

In some implementations, the components (a)-(d) are configured to pass a restrictive state message to a subsequent component or to the restrictive state analyzer as the incoming access stream processing proceeds. In other implementations, the components (a)-(d) are configured to send a restrictive state message to a common state store for processing by the restrictive state analyzer as the incoming access stream processing proceeds.

For some implementations, the components (a)-(d) are configured to set a restrictive state flag in a common flag store for processing by the restrictive state analyzer as the incoming access stream processing proceeds. In other implementations, the components (a)-(d) are configured to save a restrictive state flag as the incoming access stream processing winds from a first component to a last component and then to invoke the restrictive state analyzer with the saved restrictive state flag to take restrictive steps as the incoming access stream processing unwinds from the last component to the first component.

Other implementations of the disclosed technology described in this section can include a tangible non-transitory computer readable storage medium, including program instructions loaded into memory that, when executed on processors, cause the processors to perform any of the methods described above. Yet another implementation of the disclosed technology described in this section can include a system including memory and one or more processors operable to execute computer instructions, stored in the memory, to perform any of the methods described above.

The preceding description is presented to enable the making and use of the technology disclosed. Various modifications to the disclosed implementations will be apparent, and the general principles defined herein may be applied to other implementations and applications without departing from the spirit and scope of the technology disclosed. Thus, the technology disclosed is not intended to be limited to the implementations shown, but is to be accorded the widest scope consistent with the principles and features disclosed herein. The scope of the technology disclosed is defined by the appended claims.

What is claimed is:

1. A system for providing cloud-based network security, the system including:
    a cloud access security broker (CASB) component that runs on cloud-based hardware and is configured for providing security with respect to access to a cloud-based resource by users within an organization, via processing of one or more received packets being communicated between said users of said organization through a set of firewall components to said cloud-based resource, in compliance with a unified security policy;
    a secure web gateway (SWG) component that runs on cloud-based hardware and is configured for providing security with respect to access to a web accessible destination by said users within an organization, via processing of one or more received packets being communicated between said users of said organization through the set of firewall components and said web accessible destination, in compliance with the unified security policy;
    the set of firewall components that run on cloud-based hardware and are configured for providing packet-level and protocol-level traffic inspection and access control, with respect to received packets, and for selectively forwarding said received packets to the CASB and SWG dependent on a type of stream to which said received packets belong; and
    a restrictive state analyzer that runs on cloud-based hardware, that is configured to be in communication with each of said components, and that is configured for determining if and what action should be performed with respect to said each packet, in response to said communication with at least one of said components and in compliance with the unified security policy.

2. The system of claim 1 wherein said cloud access security broker (CASB) component is configured for identification of a user within a user group within said organization that is attempting to access a cloud-based resource, via processing of a received packet, and configured for determination if said user is permitted to access said cloud-based resource, in compliance with said security policy.

3. The system of claim 1 wherein said secure web gateway (SWG) component is configured for identification of a user within a user group within said organization that is attempting to access a web accessible destination, via processing of a received packet, and configured for determination if said user within said user group is permitted to access said web accessible destination, in compliance with said security policy.

4. The system of claim 1 wherein said firewall components are configured to inspect packet headers via processing of a received packet, and for identification of a malformation within said received packet, and for communication of said identification with said restrictive state analyzer to determine performance of an action with respect to said received packet, in compliance with said security policy.

5. The system of claim 1 wherein said firewall components are configured to perform deep packet inspection via processing of a received packet, and for identification of whether said received packet is inspectable or non-inspectable, and for communication of said identification with said restrictive state analyzer, for a restrictive state analyzer determination of performance of an action with respect to said received packet, in compliance with said security policy.

6. The system of claim 1 wherein said action with respect to said each packet, is selected among actions of allow, block, alert, bypass, coach and quarantine and no action.

7. The system of claim 1 wherein said access to a cloud based resource includes access to a cloud-based service and includes access to data provided by said cloud-based service.

8. A method for providing cloud-based network security, the method including the steps of:
    providing a cloud access security broker (CASB) component that runs on cloud-based hardware and is configured for providing security with respect to access to a cloud-based resource by users within an organization, via processing of one or more received packets being communicated between said users of said organization through a set of firewall components to said cloud-based resource, in compliance with a unified security policy;
    providing a secure web gateway (SWG) component that runs on cloud-based hardware and is configured for providing security with respect to access to a web accessible destination by said users within an organization, via processing of one or more received packets being communicated between said users of said organization through the set of firewall components and said web accessible destination, in compliance with the security policy;
    providing the set of firewall components that run on cloud-based hardware and are configured for providing packet-level and protocol-level traffic inspection and access control, with respect to received packets, and for selectively forwarding said received packets to the CASB and SWG dependent on a type of stream to which said received packets belong; and
    providing a restrictive state analyzer that runs on cloud-based hardware, that is configured to be in communication with each of said components, and that is configured for determining if and what action should be performed with respect to said each packet, in response to said communication with at least one of said components and in compliance with the unified security policy.

9. The method of claim 8 wherein said cloud access security broker (CASB) component is configured for identification of a user within a user group within said organization that is attempting to access a cloud-based resource, via processing of a received packet, and for determination if said user is permitted to access said cloud-based resource, in compliance with said security policy.

10. The method of claim 8 wherein said secure web gateway (SWG) component is configured for identification of a user within a user group within said organization that is attempting to access a web accessible destination, via processing of a received packet, and configured for determination if said user within said user group is permitted to access said web accessible destination, in compliance with said security policy.

11. The method of claim 8 wherein said firewall components are configured to inspect packet headers via processing of a received packet, and for identification of a malformation within said received packet, and for communication of said identification with said restrictive state analyzer for determination by said restrictive analyzer, of performance of an action with respect to said received packet, in compliance with said security policy.

12. The method of claim 8 wherein said firewall components are configured to perform deep packet inspection via processing of a received packet, and for identification of whether said received packet is inspectable or non-inspectable, and for communication of said identification with said restrictive state analyzer, for a determination by said restrictive state analyzer of performance of an action with respect to said received packet, in compliance with said security policy.

13. The method of claim 8 wherein said action with respect to said each packet, is selected among actions of allow, block, alert, bypass, coach and quarantine and no action.

14. The method of claim 8 wherein said access to a cloud based resource includes access to a cloud-based service and to data provided by said cloud-based service.

15. A tangible non-transitory computer readable medium including program instructions that, when executed on one or more processors, cause the processors to implement a method, the method including actions of:
   providing a cloud access security broker (CASB) component that runs on cloud-based hardware and is configured for providing security with respect to access to a cloud-based resource by users within an organization, via processing of one or more received packets being communicated between said users of said organization through a set of firewall components to said cloud-based resource, in compliance with a unified security policy;
   providing a secure web gateway (SWG) component that runs on cloud-based hardware and is configured for providing security with respect to access to a web accessible destination by said users within an organization, via processing of one or more received packets being communicated between said users of said organization through a set of firewall components to said web accessible destination, in compliance with the unified security policy;
   providing the set of firewall components that run on cloud-based hardware and are configured for providing packet-level and protocol-level traffic inspection and access control, with respect to received packets, and for selectively forwarding said received packets to the CASB and SWG dependent on a type of stream to which said received packets belong; and
   providing a restrictive state analyzer that runs on cloud-based hardware, that is configured to be in communication with each of said components, and that is configured for determining if and what action should be performed with respect to said each packet, in response to said communication with at least one of said components and in compliance with the unified security policy.

16. The medium of claim 15 wherein said cloud access security broker (CASB) component is configured for identification of a user within a user group within said organization that is attempting to access a cloud-based resource, via processing of a received packet, and for determination if said user is permitted to access said cloud-based resource, in compliance with said security policy.

17. The medium of claim 15 wherein said secure web gateway (SWG) component is configured for identification of a user within a user group within said organization that is attempting to access a web accessible destination, via processing of a received packet, and configured for determination if said user within said user group is permitted to access said web accessible destination, in compliance with said security policy.

18. The medium of claim 15 wherein said firewall components are configured to perform deep packet inspection via processing of a received packet, and for identification of whether said received packet is inspectable or non-inspectable, and for communication of said identification with said restrictive state analyzer, for a restrictive state analyzer determination of performance of an action with respect to said received packet, in compliance with said security policy.

19. The medium of claim 15 wherein said action with respect to said each packet, includes actions of allow, block, alert, bypass, coach and quarantine and no action.

20. The medium of claim 15 wherein said access to a cloud based resource includes access to a cloud-based service and includes access to data provided by said cloud-based service.

* * * * *